US012464289B2

(12) United States Patent
Gong et al.

(10) Patent No.: US 12,464,289 B2
(45) Date of Patent: Nov. 4, 2025

(54) MICRO SPEAKER STRUCTURE WITH NOVEL MAGNET DESIGN

(71) Applicant: Fortemedia, Inc., Alviso, CA (US)

(72) Inventors: Shih-Chin Gong, Taipei (TW); Yu-Xuan Xu, Hsinchu (TW)

(73) Assignee: FORTEMEDIA, INC., Alviso, CA (US)

( * ) Notice: Subject to any disclaimer, the term of this patent is extended or adjusted under 35 U.S.C. 154(b) by 196 days.

(21) Appl. No.: 18/482,302

(22) Filed: Oct. 6, 2023

(65) Prior Publication Data

US 2025/0008270 A1 Jan. 2, 2025

Related U.S. Application Data

(60) Provisional application No. 63/511,195, filed on Jun. 30, 2023.

(51) Int. Cl.
*H04R 9/02* (2006.01)
*H04R 9/06* (2006.01)

(52) U.S. Cl.
CPC ............... *H04R 9/025* (2013.01); *H04R 9/06* (2013.01)

(58) Field of Classification Search
CPC ...... H04R 9/025; H04R 9/06; H04R 2499/11; H04R 31/00; H04R 9/047; H04R 1/025; H04R 19/04; H05K 1/181
See application file for complete search history.

(56) References Cited

U.S. PATENT DOCUMENTS

| | | | | |
|---|---|---|---|---|
| 10,194,246 | B2 * | 1/2019 | Morgan | H04R 9/025 |
| 10,459,019 | B2 | 10/2019 | Wu | |
| 11,818,563 | B2 * | 11/2023 | Chen | H04R 1/025 |
| 12,060,262 | B2 * | 8/2024 | Fu | H04R 31/00 |
| 12,170,877 | B2 * | 12/2024 | Xu | H04R 9/047 |
| 2012/0163651 | A1 * | 6/2012 | Zhang | H04R 9/025 381/407 |
| 2012/0308070 | A1 * | 12/2012 | Lee | H04R 9/025 381/412 |

(Continued)

FOREIGN PATENT DOCUMENTS

| | | |
|---|---|---|
| TW | 201916700 A | 4/2019 |
| TW | I755127 B | 2/2022 |

(Continued)

OTHER PUBLICATIONS

Chinese language office action dated Dec. 23, 2024, issued in application No. TW 112147418.

*Primary Examiner* — Angelica M McKinney
(74) *Attorney, Agent, or Firm* — McClure, Qualey & Rodack, LLP

(57) ABSTRACT

A micro speaker structure is provided. The micro speaker structure includes a substrate, a diaphragm, a coil, a circuit board, and a magnet member. The substrate has a hollow space. The diaphragm is disposed over the substrate and covers the hollow chamber. The coil is embedded in the diaphragm. The circuit board is attached to the substrate. The magnet member is disposed on the circuit board and in the hollow chamber. The magnet member has a first side facing the coil and a second side opposite the first side, wherein the first side includes a first polar area and a second polar area having different polarities.

17 Claims, 18 Drawing Sheets

(56) References Cited

U.S. PATENT DOCUMENTS

| | | | | |
|---|---|---|---|---|
| 2016/0037265 | A1* | 2/2016 | Khenkin ................ | H04R 19/04<br>381/174 |
| 2020/0344551 | A1* | 10/2020 | Chen ...................... | H05K 1/181 |
| 2023/0053470 | A1 | 2/2023 | Chou | |

FOREIGN PATENT DOCUMENTS

| | | | | | |
|---|---|---|---|---|---|
| TW | 202243495 | A | | 11/2022 | |
| TW | 202310641 | A | | 3/2023 | |
| WO | WO-2015178760 | A1 | * | 11/2015 | ............. H04R 31/00 |

* cited by examiner

MICRO SPEAKER STRUCTURE WITH NOVEL MAGNET DESIGN

CROSS REFERENCE TO RELATED APPLICATIONS

This application claims the benefit of U.S. Provisional Application No. 63/511,195, filed on Jun. 30, 2023, the entirety of which is incorporated by reference herein.

BACKGROUND OF THE INVENTION

Field of the Invention

The invention relates in general to a micro speaker structure, and in particular to a micro speaker structure with a novel magnet design.

Description of the Related Art

Since electronic products are becoming smaller and thinner, how to scale down the size of electronic products has become an important topic. Micro electromechanical system (MEMS) technology is a technology that combines semiconductor processing and mechanical engineering, which can effectively reduce the size of components and produce multi-functional micro elements and micro systems.

The manufacturing of traditional moving coil speakers has become quite mature, but the traditional moving coil speakers have a larger size and more volume. If a MEMS process is used to manufacture a moving coil speaker on a semiconductor chip, the size and volume will be reduced. However, in addition to reducing the size to facilitate manufacturing, it is still necessary to develop a micro moving coil speaker with better performance.

BRIEF SUMMARY OF THE INVENTION

An embodiment of the invention provides a micro speaker structure. The micro speaker structure includes a substrate, a diaphragm, a coil, a circuit board, and a magnet member. The substrate has a hollow space. The diaphragm is disposed over the substrate and covers the hollow chamber. The coil is embedded in the diaphragm. The circuit board is attached to the substrate. The magnet member is disposed on the circuit board and in the hollow chamber. The magnet member has a first side facing the coil and a second side opposite the first side, wherein the first side includes a first polar area and a second polar area having different polarities.

In some embodiments, the first side and the second side of the magnet member have different polarities.

In some embodiments, the magnet member has a cylindrical structure, wherein the first polar area is located in the central area of the first side, and the second polar area is located in the peripheral area of the first side surrounding the central area.

In some embodiments, the magnet member includes a first magnet having a cylindrical structure and a second magnet having a ring structure surrounding the cylindrical structure, wherein the first magnet and the second magnet have different polarities at respective first ends adjacent to the first side and have different polarities at respective second ends adjacent to the second side.

In some embodiments, the magnet member has an opening formed in the first magnet and extending through the first end and the second end of the first magnet.

In some embodiments, the magnet member has an opening around the first magnet and separating the first magnet from the second magnet.

In some embodiments, the magnet member is an integral structure that includes a first (magnetic) segment and a second (magnetic) segment, wherein the first segment has a cylindrical structure, and the second segment has a ring structure surrounding the cylindrical structure, and wherein the first segment and the second segment have different polarities at respective first ends adjacent to the first side and have different polarities at respective second ends adjacent to the second side.

In some embodiments, the magnet member has a cylindrical structure, wherein the first polar area is located in the central area of the first side, and the first side further includes a plurality of second polar areas located around the first polar area, with a non-polar area between the first polar area and the second polar areas.

In some embodiments, the magnet member is an integral structure that includes a first (magnetic) segment and a plurality of second (magnetic) segments, wherein each of the first segment and the second segments has a cylindrical structure, the second segments are located around the first segment, and the first segment and the second segments are surrounded by a non-polar segment, and wherein the first segment and the second segments have different polarities at respective first ends adjacent to the first side and have different polarities at respective second ends adjacent to the second side.

In some embodiments, the first side has the same polarity as the second side.

In some embodiments, the magnet member has a cuboid structure, wherein the first polar area is located in the middle area of the first side, and the first side further includes a third polar area, wherein the second polar area and the third polar area are located on both sides of the first polar area and have the same polarity.

In some embodiments, the magnet member is an integral structure that includes a first (magnetic) segment, a second (magnetic) segment and a third (magnetic) segment, wherein each of the first segment, the second segment and the third segment has a cuboid structure, and the second segment and the third segment are located on both sides of the first segment, and wherein the first segment has a first polarity, and the second segment and the third segment both have a second polarity that is different from the first polarity.

In some embodiments, the magnet member further includes a fourth (magnetic) segment surrounded by the first segment, and the fourth segment has the same polarity as the second segment and the third segment.

In some embodiments, the magnet member includes a permanent magnet and a magnetic permeability element, the permanent magnet is in direct contact with the top surface of the magnetic permeability element, and the magnetic permeability element has a sidewall extending from the top surface and surrounding the permanent magnet, wherein a first end of the permanent magnet adjacent to the first side and a second end of the permanent magnet adjacent to the second side have different polarities, and the magnetic permeability element and the first end of the permanent magnet have different polarities.

In some embodiments, the coil vertically overlaps both the first polar area and the second polar area.

In some embodiments, the micro speaker structure further includes a package lid and a permanent magnet, the package lid is wrapped around the substrate and the diaphragm, and the package lid has a lid opening that exposes a portion of the diaphragm, and the permanent magnet is disposed on the package lid.

In some embodiments, the coil is a multi-layered coil including a first layer and a second layer, wherein the first layer has a spiral structure surrounding the central axis of the diaphragm, and the second layer crosses over the spiral structure of the first layer and is electrically connected to the first layer.

In some embodiments, the coil is a multi-layered coil including a first layer and a second layer, wherein the first layer comprises a plurality of coaxial segments disposed around the central axis of the diaphragm, and the coaxial segments are electrically connected by the second layer.

In some embodiments, the second layer is disposed symmetrically around the central axis of the diaphragm.

Another embodiment of the invention provides a micro speaker structure. The micro speaker structure includes a substrate, a diaphragm, a coil, a circuit board, and a magnet member. The substrate has a hollow space. The diaphragm is disposed over the substrate and covers the hollow chamber. The coil is embedded in the diaphragm. The circuit board is attached to the substrate. The magnet member is disposed on the circuit board and in the hollow chamber. The magnet member includes a first magnetic segment, a plurality of second magnetic segments around the first magnetic segment, and a non-polar segment surrounding and in between the first magnetic segment and the second magnetic segments, wherein on the top side of the magnet member facing the coil, the first magnetic segment has a first polarity and the second magnetic segments have a second polarity that is different from the first polarity.

BRIEF DESCRIPTION OF DRAWINGS

Aspects of this disclosure are best understood from the following detailed description when read with the accompanying figures. It should be noted that, in accordance with common practice in the industry, various features are not drawn to scale. In fact, the dimensions of the various features may be arbitrarily increased or reduced for clarity of discussion.

DETAILED DESCRIPTION OF INVENTION

Figure 1:
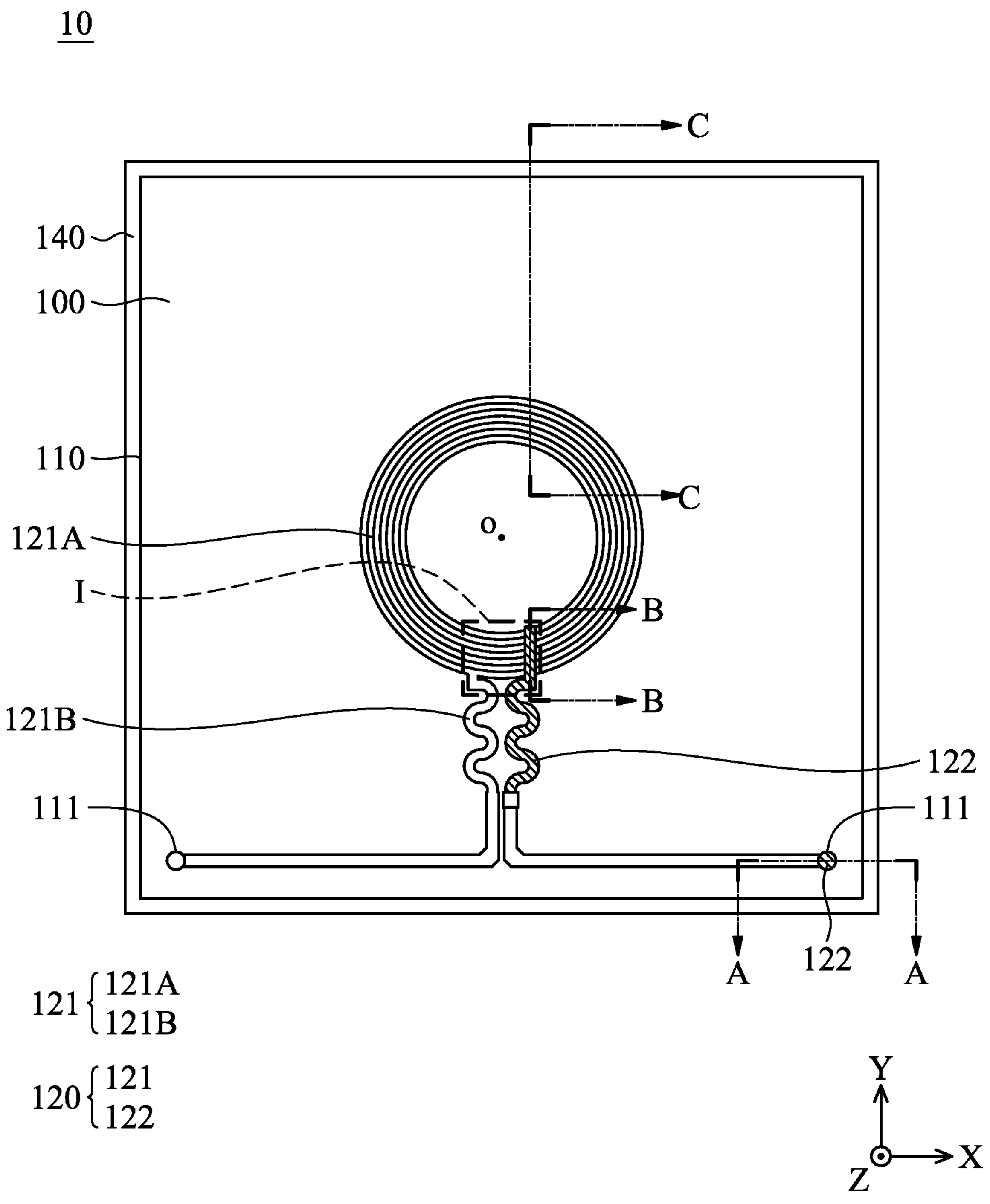
FIG. 1 illustrates a top view of a micro speaker structure, in accordance with some embodiments.

Micro speaker structures of some embodiments of the present disclosure are described in the following description. However, it should be appreciated that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all terms (including technical and scientific terms) used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

The present disclosure may repeat reference numerals and/or letters in the various examples. This repetition is for the purpose of simplicity and clarity and does not in itself dictate a relationship between the various embodiments and/or configurations discussed. Some variations of embodiments are described below. In different figures and illustrated embodiments, like element symbols are used to indicate like elements.

FIG. 1 is a top view illustrating a micro speaker structure 10, in accordance with some embodiments. The micro speaker structure 10 is an electroacoustic transducer, such as a micro moving coil speaker, and may be disposed in general electronic products. As shown in FIG. 1, the micro speaker structure 10 includes a substrate 100, a diaphragm 110, and a multi-layered coil 120. The diaphragm 110 is disposed over the substrate 100, and is movable relative to the substrate 100. It should be noted that in the example of FIG. 1, the diaphragm 110 is illustrated to be transparent in order to show internal structures of the micro speaker structure 10.

In addition, the multi-layered coil 120 is embedded in the diaphragm 110, which means that the multi-layered coil is not exposed. The multi-layered coil is configured to transmit electric signals, and drives the diaphragm 110 to deform relative to the substrate 100 according to the electric signals. Two openings 111 are formed in the diaphragm 110. The multi-layered coil 120 includes a first layer 121 and a second layer 122, and the first layer 121 is electrically connected to the second layer 122 in at least one of the openings 111. The first layer 121 and the second layer 122 are located on different horizontal planes which are parallel to the X-Y plane. In the present embodiment, the second layer 122 is higher than the first layer 121. That is, the second layer 122 is closer to the top of the diaphragm 110 than the first layer 121.

Figure 2:
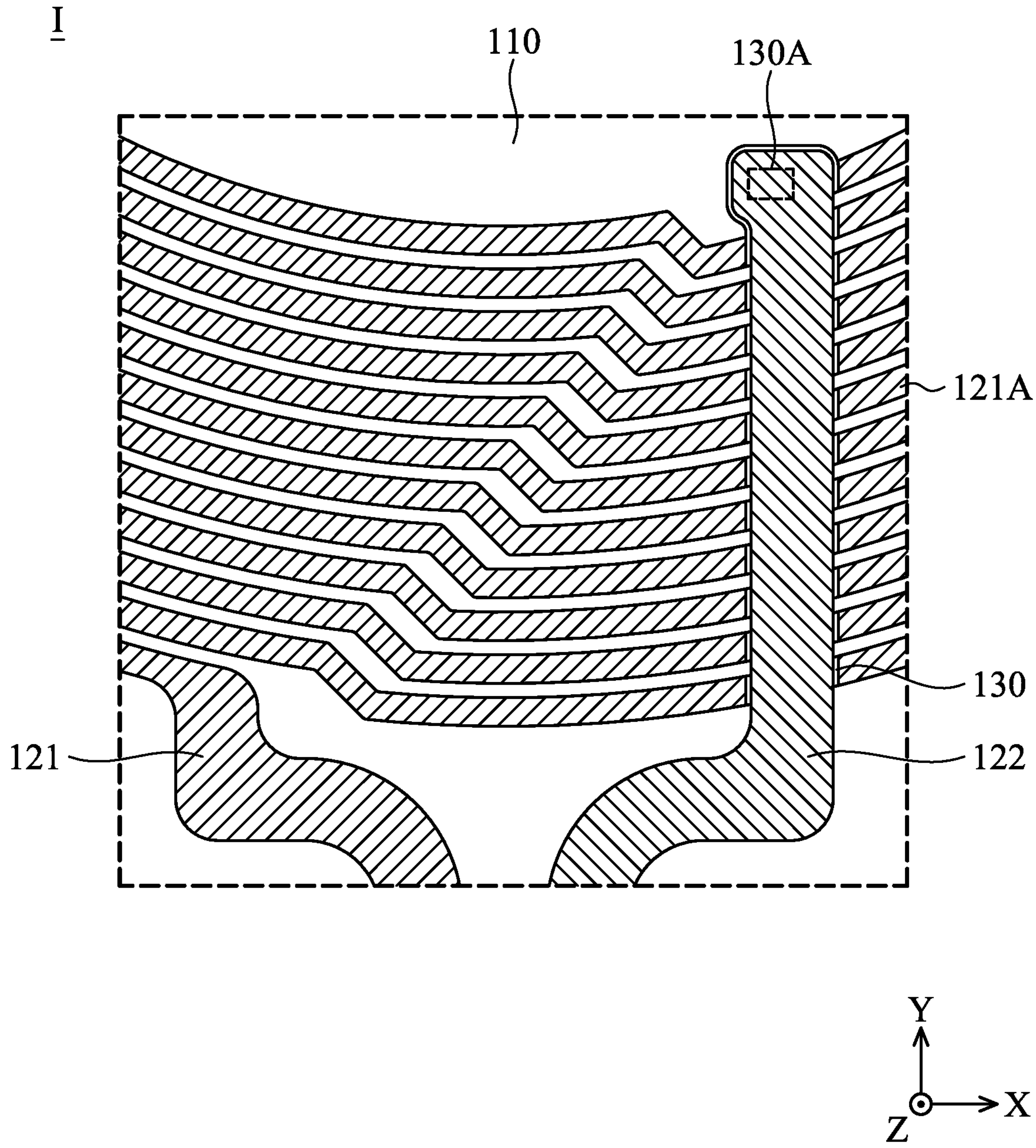
FIG. 2 illustrates an enlarged view of the area I shown in FIG. 1A, in accordance with some embodiments.

It should be noted that the first layer 121 is electrically connected to the second layer 122 in at least one of the openings 111 in order to transmit electric signals from a control unit (not shown) for controlling the operation of the micro speaker structure 10. In the present embodiment, the first layer 121 includes a spiral structure 121A and a wavy structure 121B. It should be appreciated that the multi-layered coil 120 is schematically illustrated in FIG. 1, and the detailed structure of the multi-layered coil 120 (such as the spiral structure 121A) is shown in FIG. 2. The spiral structure 121A is disposed around the central axis O of the diaphragm 110, and the wavy structure 121B connects the spiral structure 121A to one of the openings 111. Electrical signals transmitted in the multi-layered coil 120 may force the diaphragm 110 to deform (e.g., oscillate) relative to the substrate 100. By providing the wavy structure 121B, the diaphragm 110 can be more flexible, and the difficulty of the oscillation can be reduced. In addition, the second layer 122 may also include a wavy structure.

Furthermore, a cutting groove 140 is formed in the diaphragm 110, and the micro speaker structure 10 is surrounded by the cutting groove 140. Since multiple micro speaker structures 10 may be formed on a wafer, the cutting groove 140 defines the region of each of the micro speaker structures 10. In this manner, the cutting groove 140 helps to separate those micro speaker structures 10 from each other using a cutting method, such as laser cutting.

Referring next to FIG. 2, which is a schematic enlarged view illustrating the region I shown in FIG. 1, in accordance with some embodiments. As shown in FIG. 2, the second layer 122 crosses over the spiral structure 121A of the first layer 121, and a dielectric layer 130 is disposed between the first layer 121 and the second layer 122 in order to prevent a short circuit between the first layer 121 and the second layer 122. A through hole 130A (shown in dashed lines) can be formed in the dielectric layer 130 so that the first layer 121 is electrically connected to the second layer 122 via the through hole 130A. The detailed structure and formation method of the micro speaker structure 10 will be discussed as follows in accompany with FIGS. 3A to 3E.

FIGS. 3A-3E illustrate cross-sectional views of intermediate stages in the formation of the micro speaker structure 10 shown in FIG. 1, in accordance with some embodiments. It should be understood that each of the figures includes cross-sectional views along lines A-A, B-B, and C-C shown in FIG. 1. In this way, the fabrication processes of different parts of the micro speaker structure 10 can be shown in a single figure. Two sets of coordinate axes are provided in FIGS. 3A-3E, wherein one set of coordinate axes in the left-hand side correspond the cross-sectional view along line A-A, and the other set of coordinate axes in the right-hand side correspond the cross-sectional views along lines B-B and C-C.

Figure 3A:
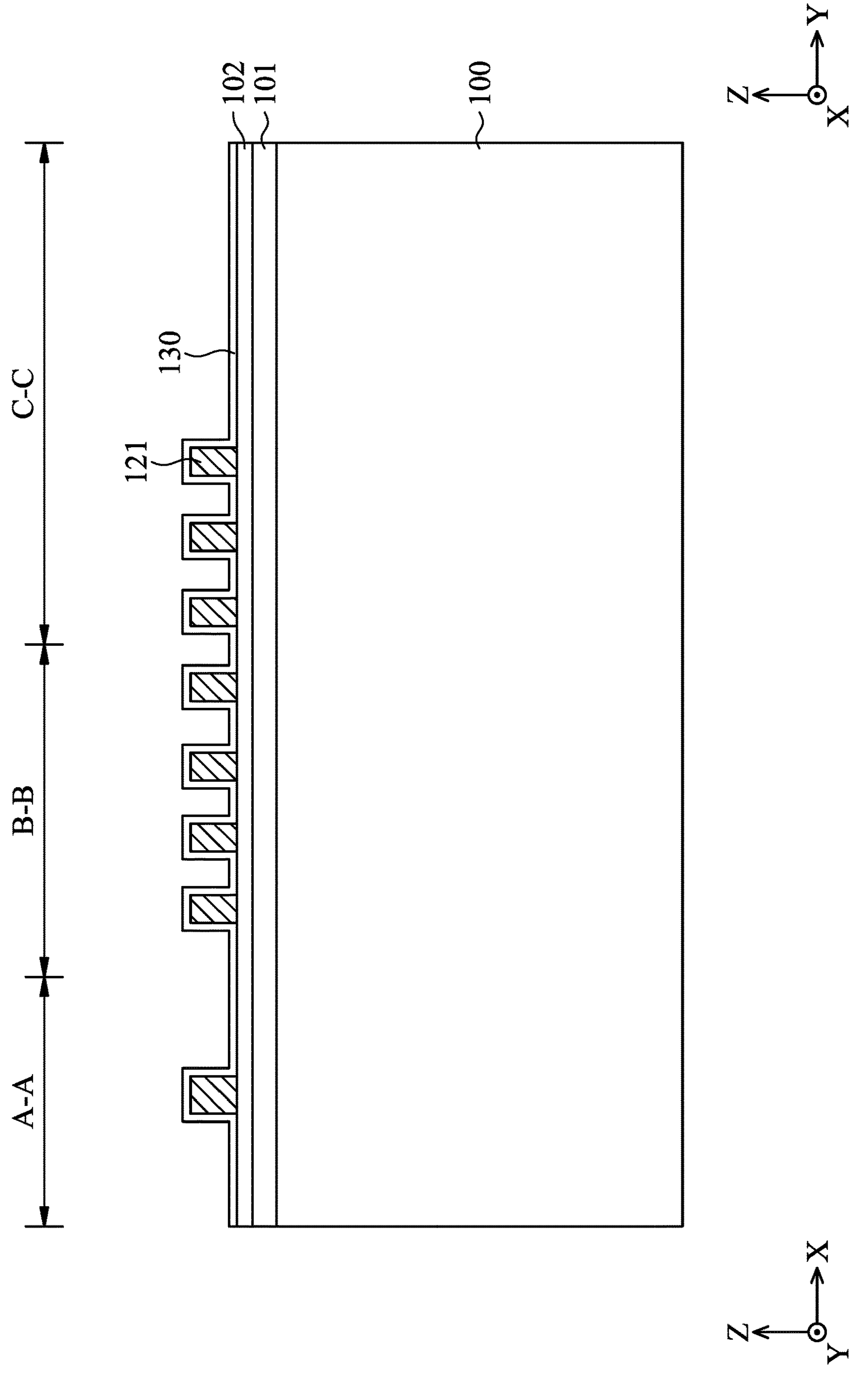
FIGS. 3A to 3E illustrate cross-sectional views of intermediate stages in the formation of the micro speaker structure shown in FIG. 1, in accordance with some embodiments.

Referring to FIG. 3A, a substrate 100 is provided. In some embodiments, the substrate 100 is part of a semiconductor wafer, and may be formed of silicon (Si). Alternatively, the substrate 100 may include other semiconductor materials, such as germanium; a compound semiconductor including silicon carbide (SiC), gallium arsenic (GaAs), gallium phosphide (GaP), gallium nitride (GaN), indium phosphide (InP), and/or indium arsenide (InAs); an alloy semiconductor including SiGe, SiGeC, GaAsP, GaInAs, and/or InGaP; or combinations thereof.

Two insulating layers 101, 102 are formed on the substrate 100, wherein the insulating layer 101 is disposed between the insulating layer 102 and the substrate 100. Each of the insulating layers 101 and 102 is made of or includes silicon dioxide ($SiO_2$) or another suitable insulating material, and may be formed by thermal oxidation, chemical vapor deposition (CVD), low pressure CVD (LPCVD), atmospheric pressure CVD (APCVD), plasma-enhanced CVD (PECVD), or any other suitable process. The first layer 121 of the multi-layered coil 120 is formed on the insulating layer 102 using electroplating or other deposition processes such as physical vapor deposition (PVD), sputtering or evaporation. The material of the first layer 121 includes aluminum silicon alloy, aluminum, copper, or any other suitable conductive material. A patterning process (e.g., including a photolithography process and/or an etching process) is then performed on the first layer 121, generating the spiral structure 121A and the wavy structure 121B shown in FIG. 1. Subsequently, the dielectric layer 130 is conformally formed on the patterned first layer 121 and the insulating layer 102 by furnace process, CVD or another suitable deposition process. The dielectric layer 130 may be a carbon-doped oxide or any other suitable insulating material.

Figure 3B:
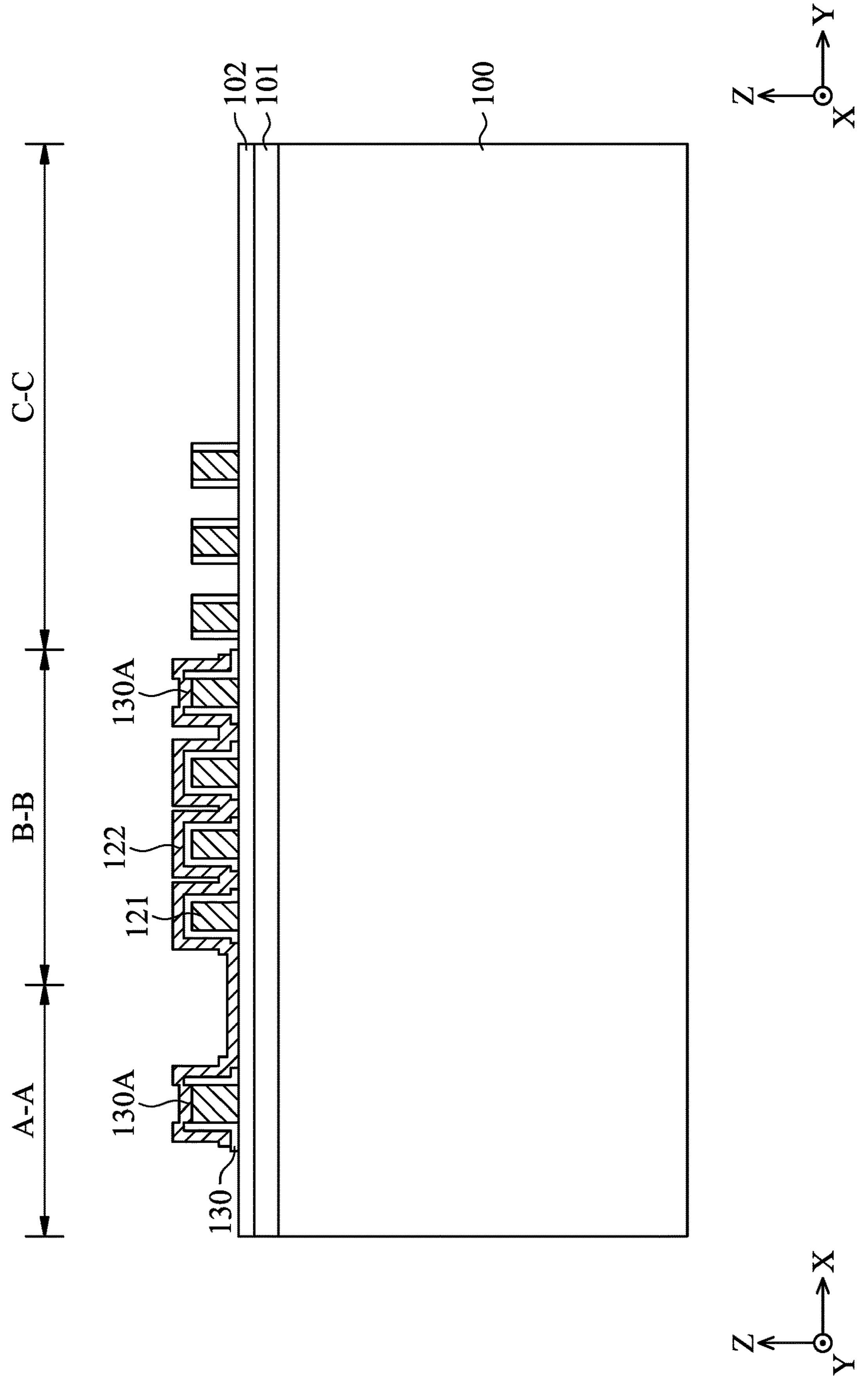

Next, in FIG. 3B, the dielectric layer 130 is patterned (e.g., through a photolithography process and/or an etching process) to form through holes 130A in the dielectric layer 130 to expose the underlying first layer 121. The second layer 122 of the multi-layered coil 120 is then formed on the dielectric layer 130 and the first layer 121 using electroplating or other deposition processes such as PVD, sputtering or evaporation. The material of the second layer 122 includes aluminum silicon alloy, aluminum, copper, or any other suitable conductive material. A patterning process (e.g., including a photolithography process and/or an etching process) is then performed on the second layer 122, leaving portions located on the dielectric layer 130 or in the through holes 130A.

It should be noted that the patterned dielectric layer 130 only leaves a portion required to electrically insulate the first layer 121 and the second layer 122. By removing undesired portions of the dielectric layer 130, the diaphragm 110 (see FIG. 3C) can be more flexible, thereby improving the performance of the micro speaker structure 10.

Although not shown, a protection layer (also referred to as a passivation layer) may also be conformally formed on the multi-layered coil 120 for protection, in some cases. In some embodiments, the protection layer has a multi-layered structure, for example, including an oxide layer (e.g., silicon oxide) and a nitride layer (e.g., silicon nitride) over the oxide layer. Alternatively, the protection layer may have a single layer structure, e.g., having a single nitride layer. The protection layer may be formed by, for example, CVD, PVD or other suitable processes.

Figure 3C:
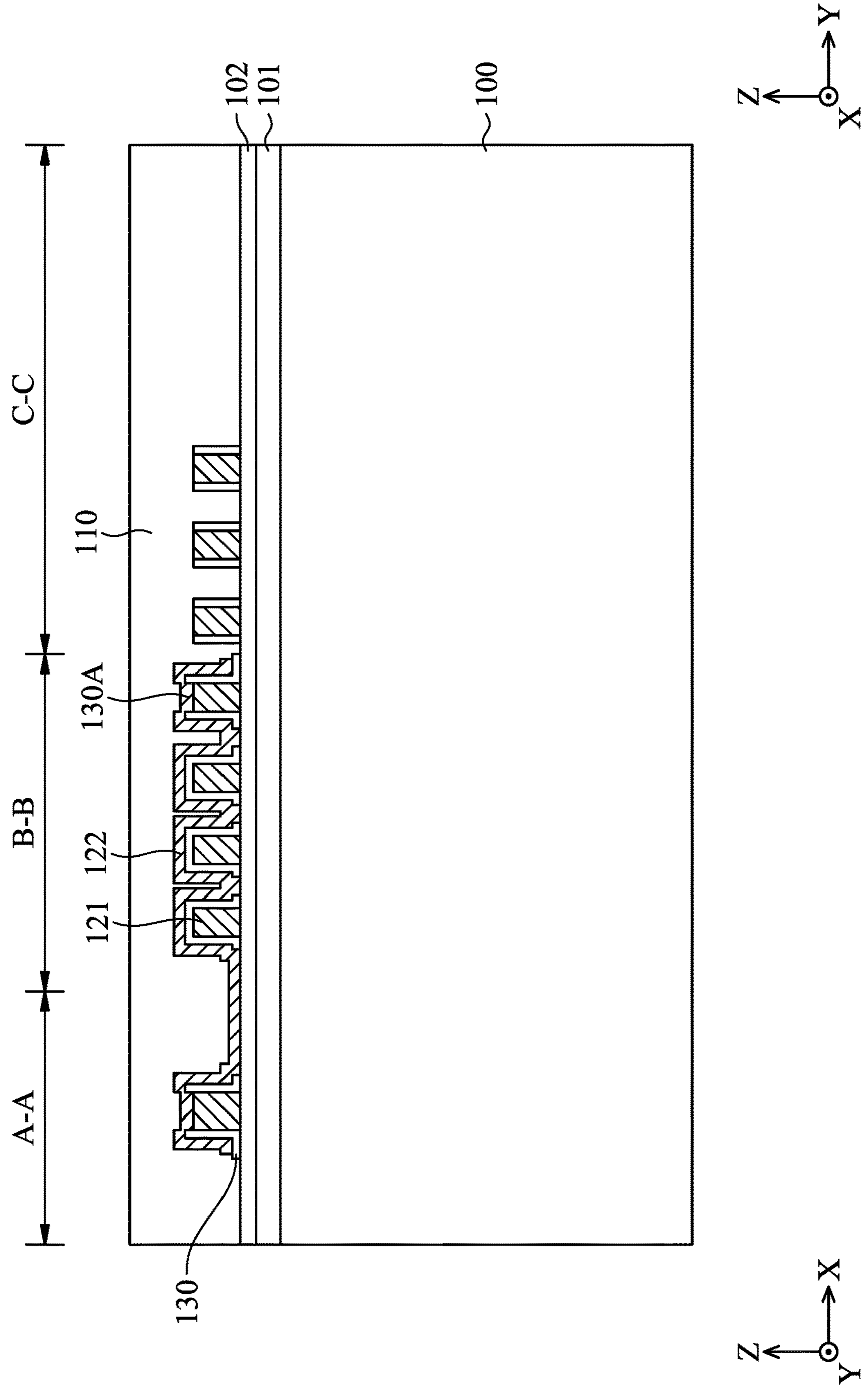

Next, in FIG. 3C, the diaphragm 110 is formed over the above-mentioned structures such that the multi-layered coil 120 and the dielectric layer 130 are embedded in the diaphragm 110 (i.e., they are not exposed). The diaphragm 110 may be formed by spin coating or any other suitable process. In some embodiments, the diaphragm 110 is made of or includes polydimethylsiloxane (PDMS), phenolic epoxy resin (such as SU-8), polyimide (PI), or a combination thereof. In an example, the diaphragm 110 is formed of PDMS, and the Young's modulus of the diaphragm 110 is in a range between about 1 MPa and about 100 GPa. Compared with a diaphragm formed of polyimide, the diaphragm 110 formed of PDMS has a smaller Young's modulus and a softer film structure, which makes the diaphragm 110 have a larger displacement, thereby generating a larger sound amplitude.

Figure 3D:
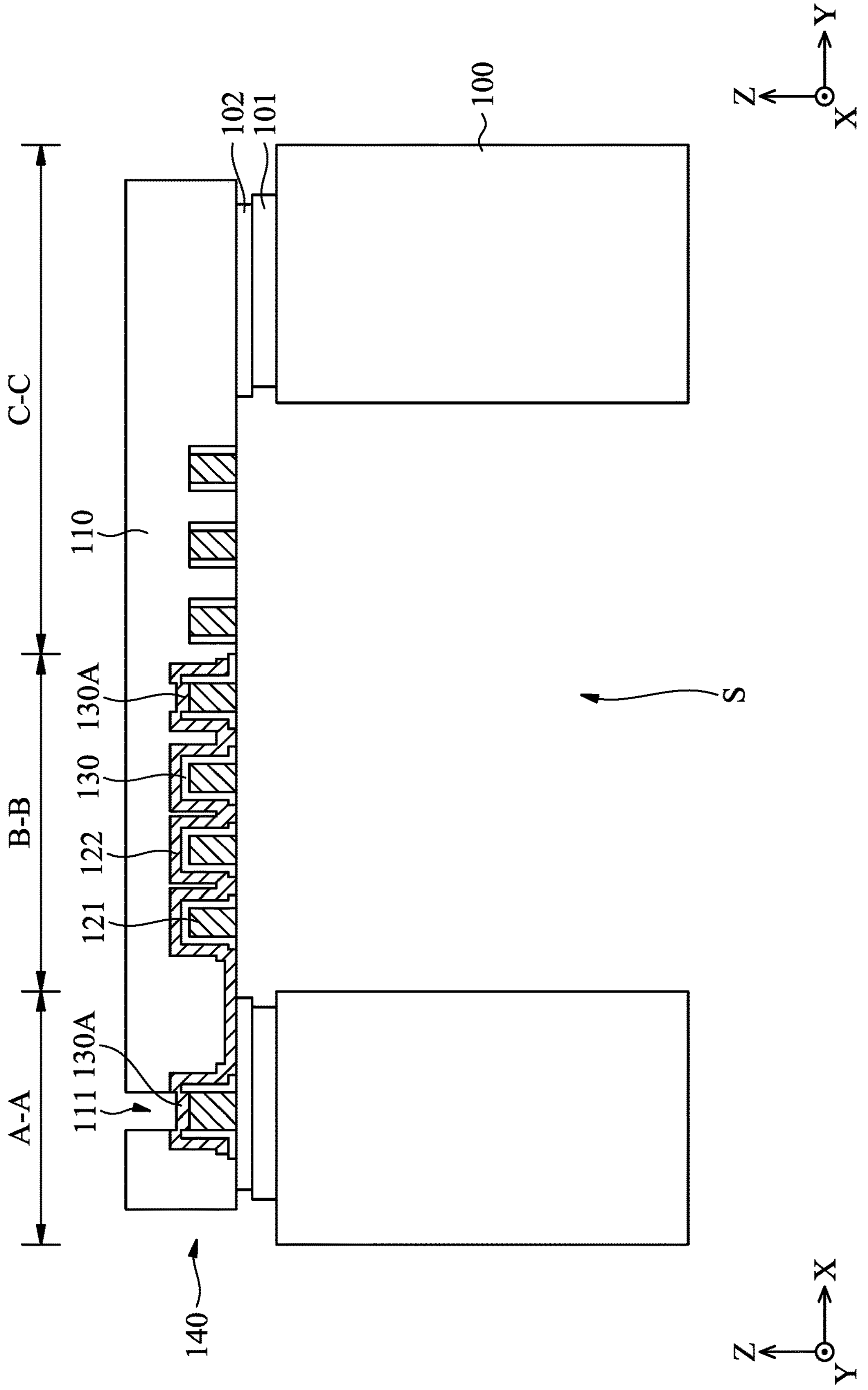

Next, in FIG. 3D, the diaphragm 110 is then patterned to form openings 111 (only one opening 111 is shown) in the diaphragm 110 and a cutting groove 140 surrounding the diaphragm 110. In some embodiments where the diaphragm 110 is made of a photosensitive material such as a photosensitive polymer material, the openings 111 and the cutting groove 140 are formed by using photolithography and etching techniques. In other embodiments where the diaphragm 110 is made of a non-photosensitive material, the openings 111 and the cutting groove 140 are formed by using drilling, cutting, and/or other suitable patterning techniques. The openings 111 may expose the underlying second layer 122 such that the first layer 121 is electrically connected to the second metal layer 122 in one of the openings 111 (as mentioned above). In other words, when viewed along the vertical direction (e.g., the Z-axis direction), one of the openings 111 of the diaphragm 110 and one of the through holes 130A may overlap. The cutting groove 140 may facilitate cutting process to separate the micro speaker structures 10, as mentioned above.

Still referring to FIG. 3D, a deep reactive-ion etching process or an etching process which applies an etchant (such as ammonium hydroxide (NH4OH), hydrofluoric acid (HF), deionized water, tetramethylammonium hydroxide (TMAH), potassium hydroxide (KOH)) is performed on the bottom surface of the substrate 100 to form a hollow chamber S in the substrate 100. The diaphragm 110 covers (e.g., is suspended over) the hollow chamber S after the etching process. It should be noted that the insulating layers 101 and 102 may act as etch stop layers during the etching process. Therefore, the diaphragm 110 and the multi-layered coil 120 are protected from being etched.

Figure 3E:
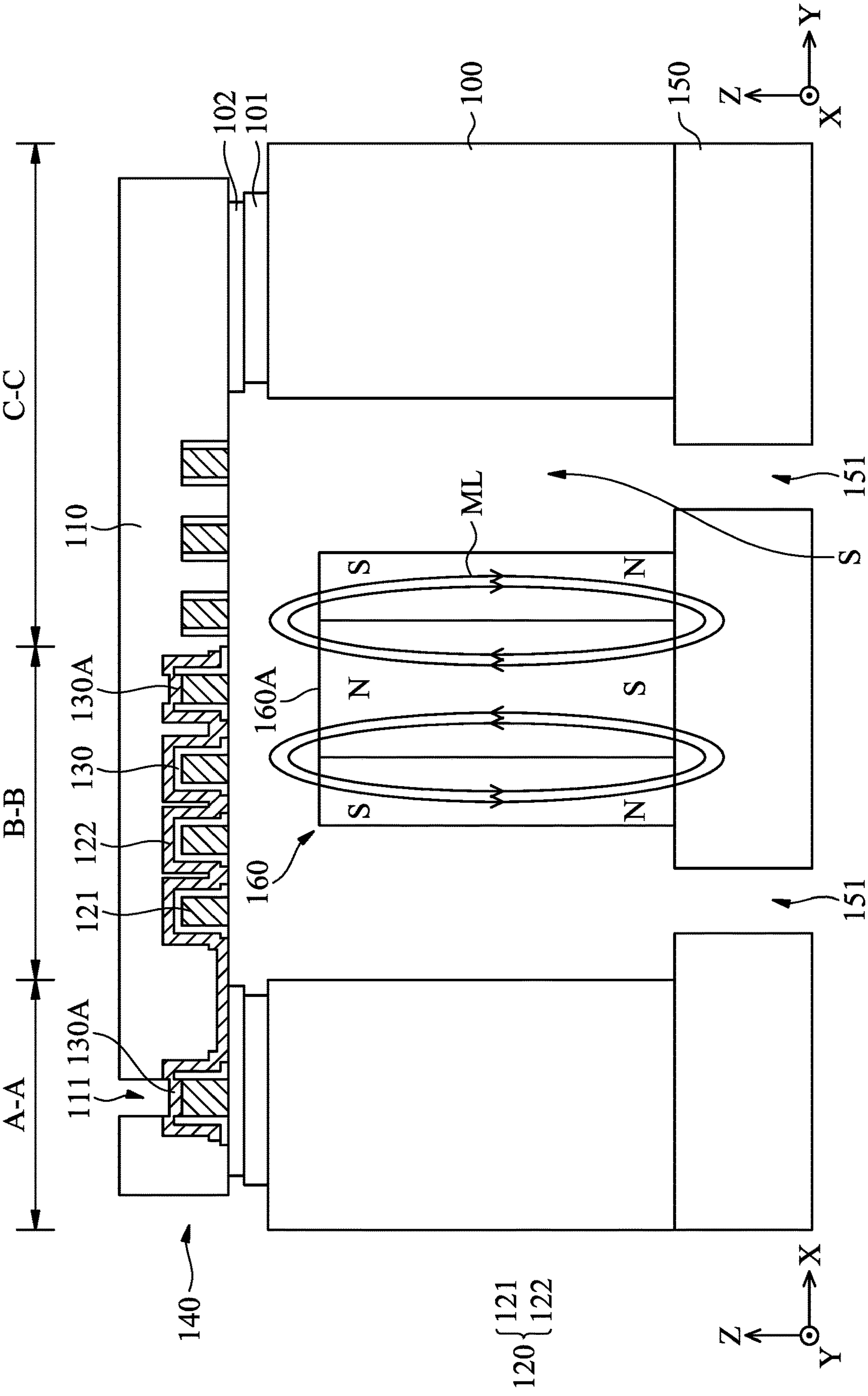

Next, in FIG. 3E, a carrier board 150 (such as a printed circuit board (PCB)) is disposed on or attached to the bottom surface of the substrate 100. Therefore, the substrate 100 is located between the carrier board 150 and the diaphragm 110. The carrier board 150 has one or more vent holes 151, which allow the hollow chamber S to communicate with the external environment.

In addition, a magnet member 160 is disposed on the carrier board 150 and in the hollow chamber S. The magnet member 160 is used to cooperate with the overlying multi-layered coil 120 (i.e., the magnetic field generated by the magnet member 160 interacts with a current passing through the multi-layered coil 120) to generate a force (e.g., Z-axis force) in the normal direction of the diaphragm 110 (i.e., the vertical/Z-axis direction, which is perpendicular to its top surface), and the diaphragm 110 can vibrate/oscillate relative to the substrate 100 due to the force to generate sound.

It should be understood that the size (e.g., thickness and/or area) of the diaphragm 110 of the micro speaker structure is smaller than the size of the diaphragm of traditional moving coil speaker. However, the size of the diaphragm is correlated with the sound pressure level (SPL). Therefore, how to increase the SPL without increasing the size of the structure is a problem that needs to be solved. The following describes novel magnet member designs proposed according to embodiments of the present disclosure to increase the SPL.

Figure 4B:
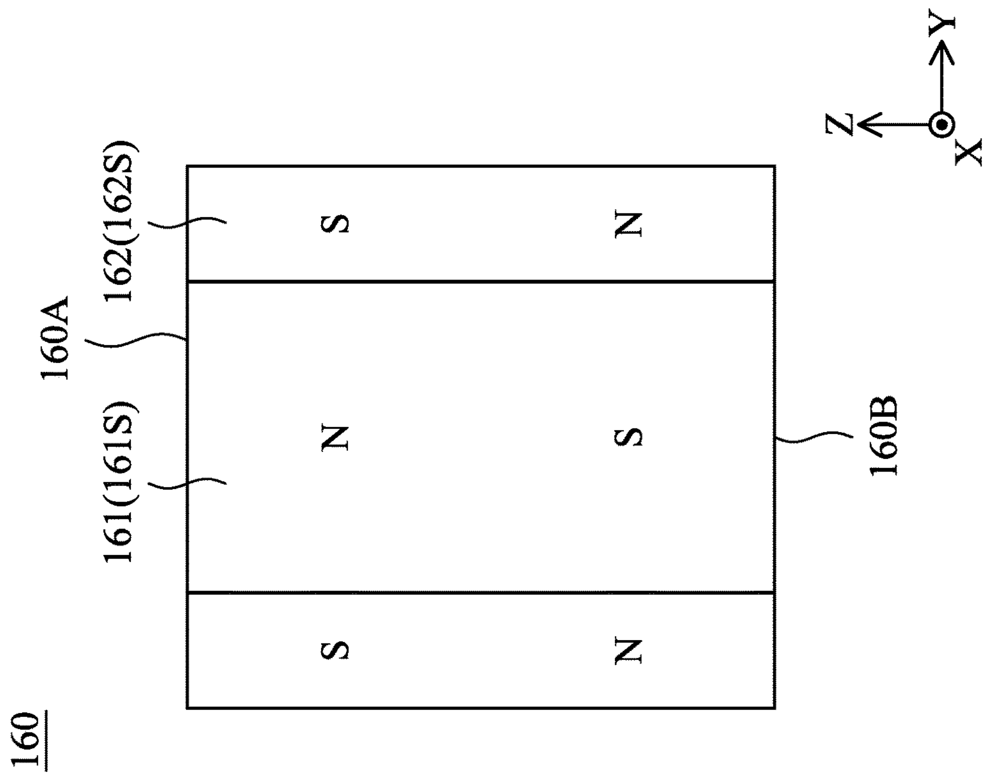
FIGS. 4A and 4B illustrate various views of a magnet member, in accordance with some embodiments.
Figure 4A:
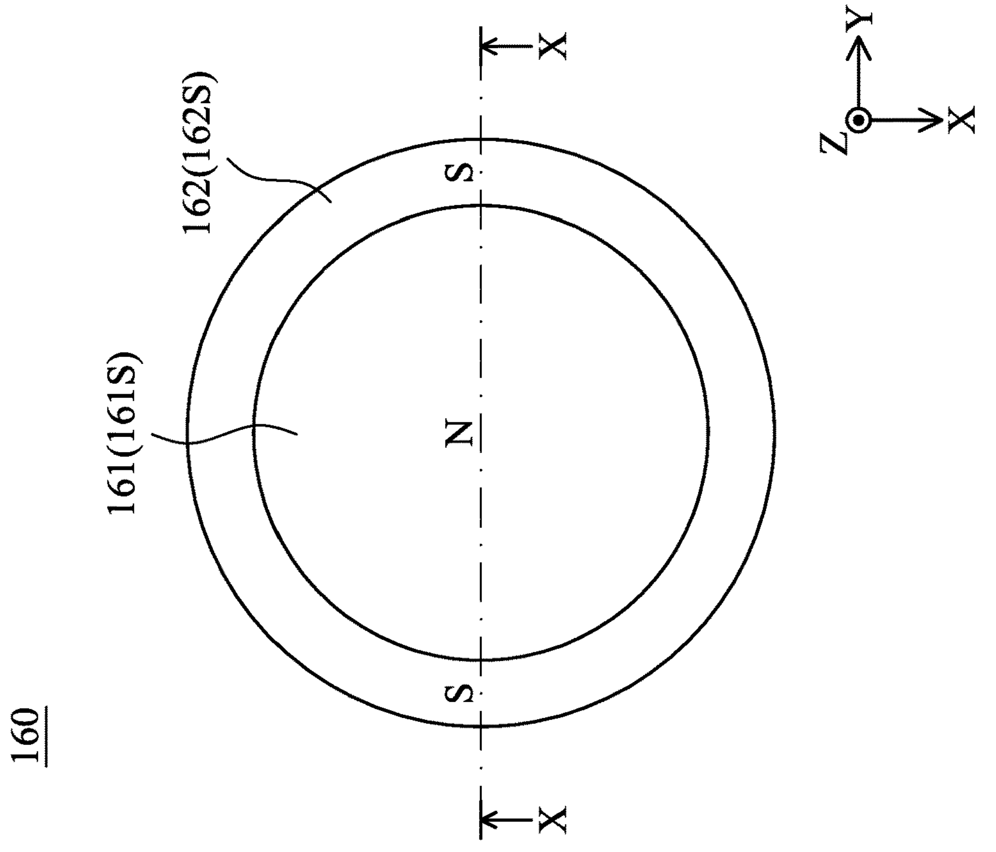

Referring to FIGS. 4A and 4B. FIG. 4A illustrates a top view of a magnet member 160 (i.e., the magnet member 160 in FIG. 3E) in accordance with some embodiments, and FIG. 4B illustrate a cross-sectional view of the magnet member 160 taken along the line X-X in FIG. 4A. In the present embodiment, the magnet member 160 consists of two magnets (161, 162), although more (e.g., three, four, etc.) magnets may be used in other embodiments. In some embodiments, each of the magnets 161 and 162 is a permanent magnet, such as a neodymium iron boron magnet. Other suitable permanent magnet materials may also be used in other embodiments.

In the example of FIGS. 4A and 4B, the magnet member 160 has a cylindrical structure, and includes a first magnet 161 having a cylindrical structure and a second magnet 162 having a (circle) ring structure surrounding the cylindrical structure. The inner diameter of the second magnet 162 may be substantially equal to the diameter of the first magnet 161 in some cases, but the disclosure is not limited thereto (which will be described later). Also, the thickness (e.g., along the Z-axis direction) of the first magnet 161 may be substantially equal to the thickness of the second magnet 162. Thus, the top surfaces of the magnets 161 and 162 form the top surface (or side) 160A of the magnet member 160 (e.g., facing the multi-layered coil 120, see FIG. 3E), and the bottom surfaces of the magnets 161 and 162 form the bottom surface (or side) 160B of the magnet member 160.

Figure 5B:
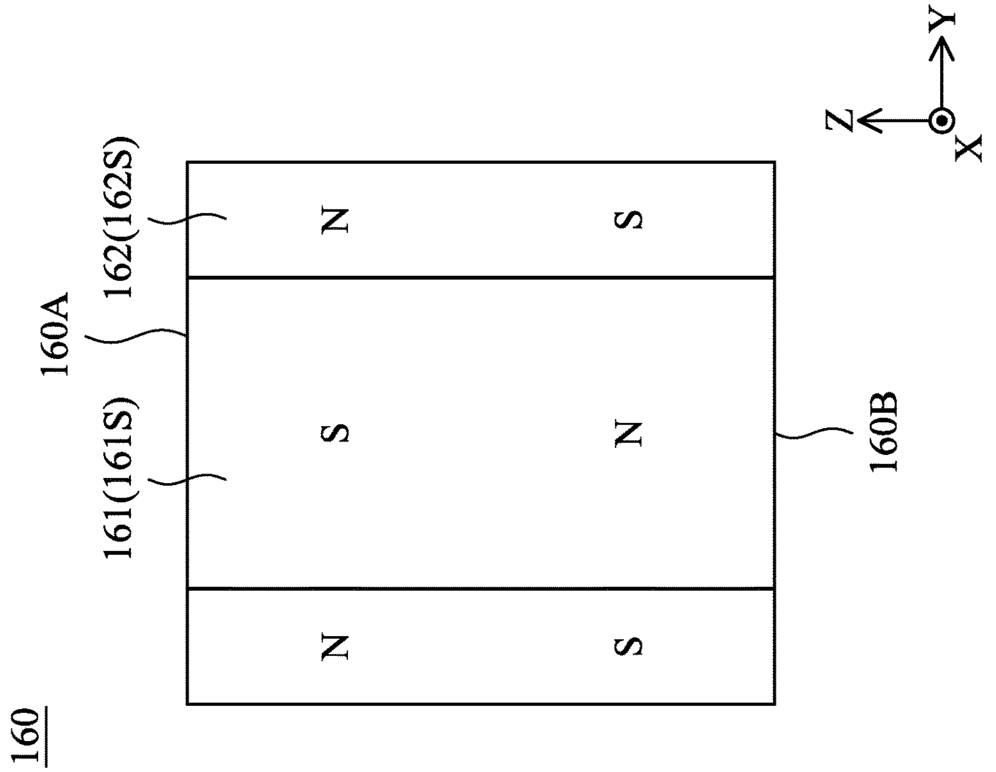
FIGS. 5A and 5B illustrate various views of a magnet member, in accordance with some embodiments.
Figure 5A:
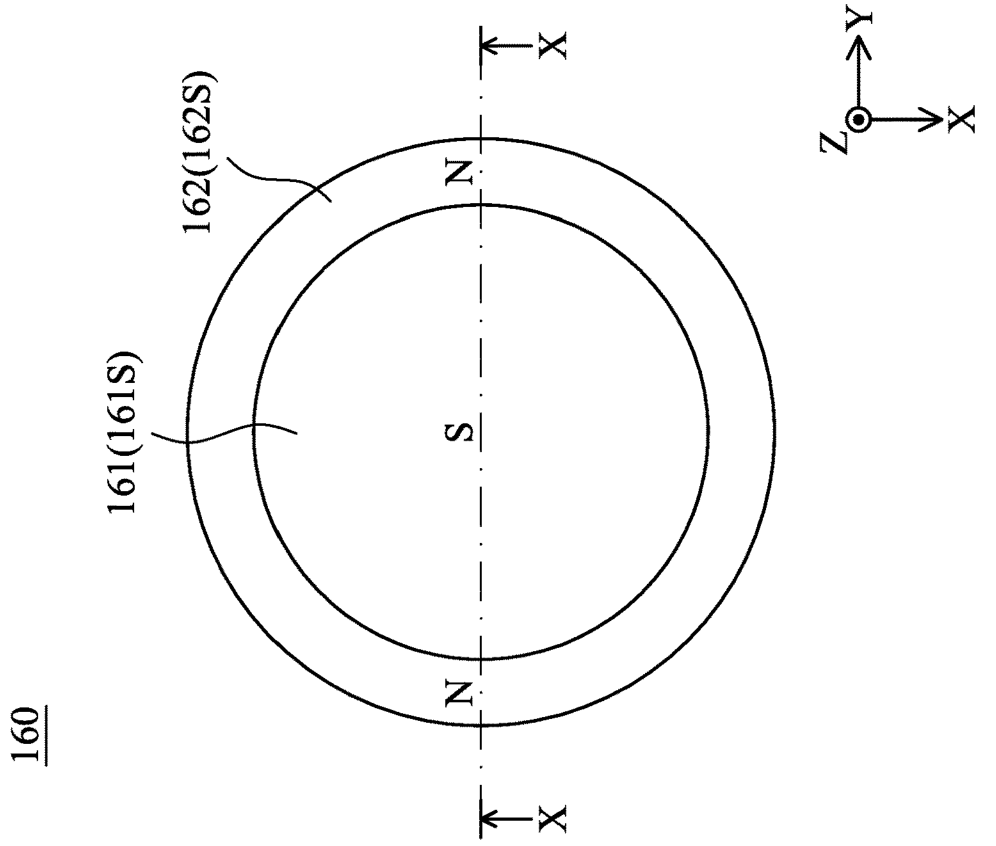

In some embodiments, the first magnet 161 and the second magnet 162 have different polarities at respective first ends (e.g., the upper ends) adjacent to the top (or first) side 160A and have different polarities at respective second ends (e.g., the lower ends) adjacent to the bottom (or second) side 160B. For example, in the example of FIGS. 4A and 4B, the first ends of the magnets 161 and 162 are N-pole and S-pole respectively, and the second ends of the magnets 161 and 162 are S-pole and N-pole respectively. However, in some alternative embodiments shown in FIGS. 5A and 5B, the N-poles and S-poles of the magnets 161 and 162 may be reversed.

With the above configuration, the first side 160A (also referred to as the magnet surface hereinafter) of the magnet member 160 may have a first polar area (where the first magnet 161 is located) and a second polar area (where the second magnet 162 is located) with different polarities. This helps to increase the distribution of magnetic lines (e.g., see the magnetic lines ML in FIG. 3E) on the first (or top) side 160A of the magnet member 160 (facing the multi-layered coil 120) compared to the case where there is only a single polar area (i.e., single pole) at the top (or at the bottom) of the traditional magnet member. In other words, the magnetic field (e.g., horizontal or planar magnetic field) on the first side 160A of the magnet member 160 can be enhanced. Accordingly, the force in the normal direction of the diaphragm 110 generated by the interaction of the magnet member 160 and the multi-layered coil 120 also increases, thereby increasing the SPL. In some embodiments, preferably, the multi-layered coil 120 vertically overlaps both the first polar area and the second polar area (i.e., the projection area of the multi-layered coil 120 on the first side 160A may overlap part of the first polar area and part of the second polar area) to increase the interaction of the magnet member 160 and the multi-layered coil 120.

Also, it should be understood that because the magnetic field generated by the magnet member 160 is larger (e.g., on the magnet surface), the magnet member 160 may have a reduced thickness (or heights) compared to conventional magnet members (i.e., with a single pole at each end) in order to achieve the same SPL, in some cases. This facilitates reducing the size (e.g., thickness) of the micro speaker structure 10. In addition, since the multiple polar areas on the magnet surface can well confine (or concentrate) the magnetic lines ML on the first side 160A, resulting in less environment interference.

Figure 6:
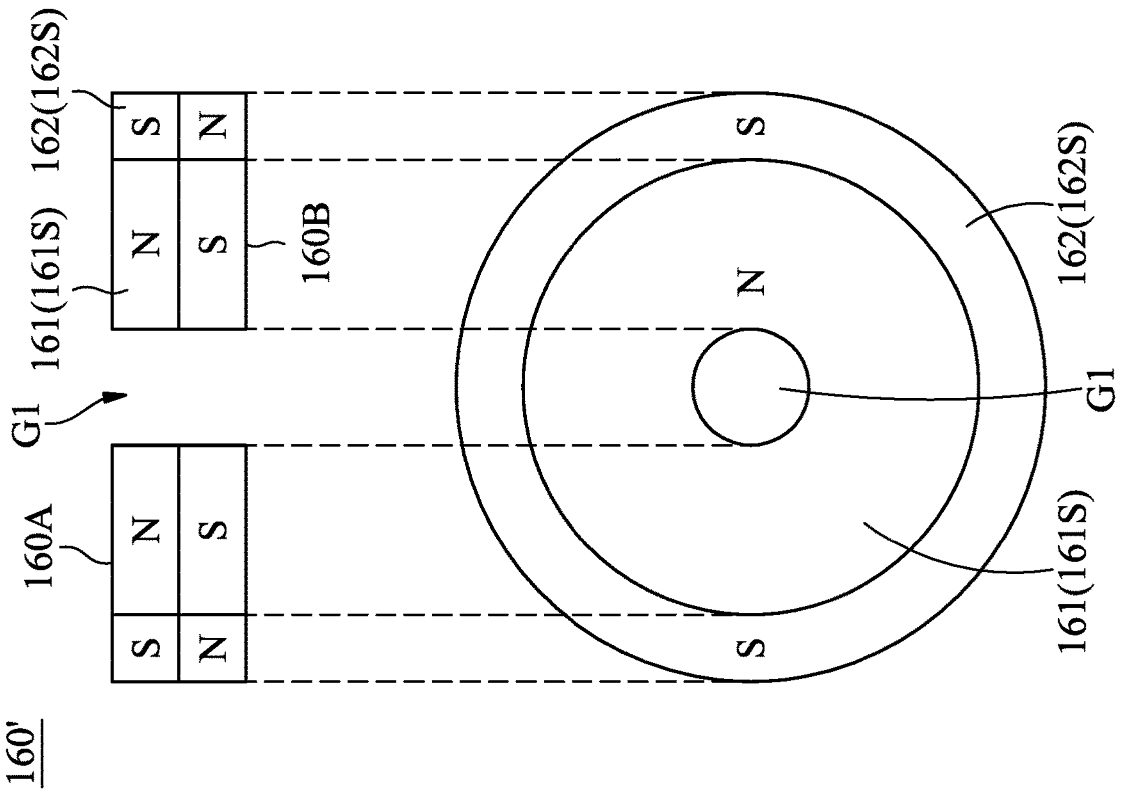
FIG. 6 illustrates various views of a magnet member, in accordance with some embodiments.

FIG. 6 illustrates various views of a magnet member 160', in accordance with an alternative embodiment, wherein the upper half of the figure shows a cross-sectional view of the magnet member 160', and the lower half shows a top view of the magnet member 160'. The magnet member 160' is similar to the magnet member 160 described above, except that magnet member 160' further has an opening G1 formed in the first magnet 161 and extending through the first (or upper) end and the second (or lower) end of the first magnet 161. The opening G1 may be aligned with the center axis of the first magnet 161, in some cases. By forming the opening G1, the distribution of magnetic lines (not specifically shown) near the opening G1 can be increased.

Figure 7:
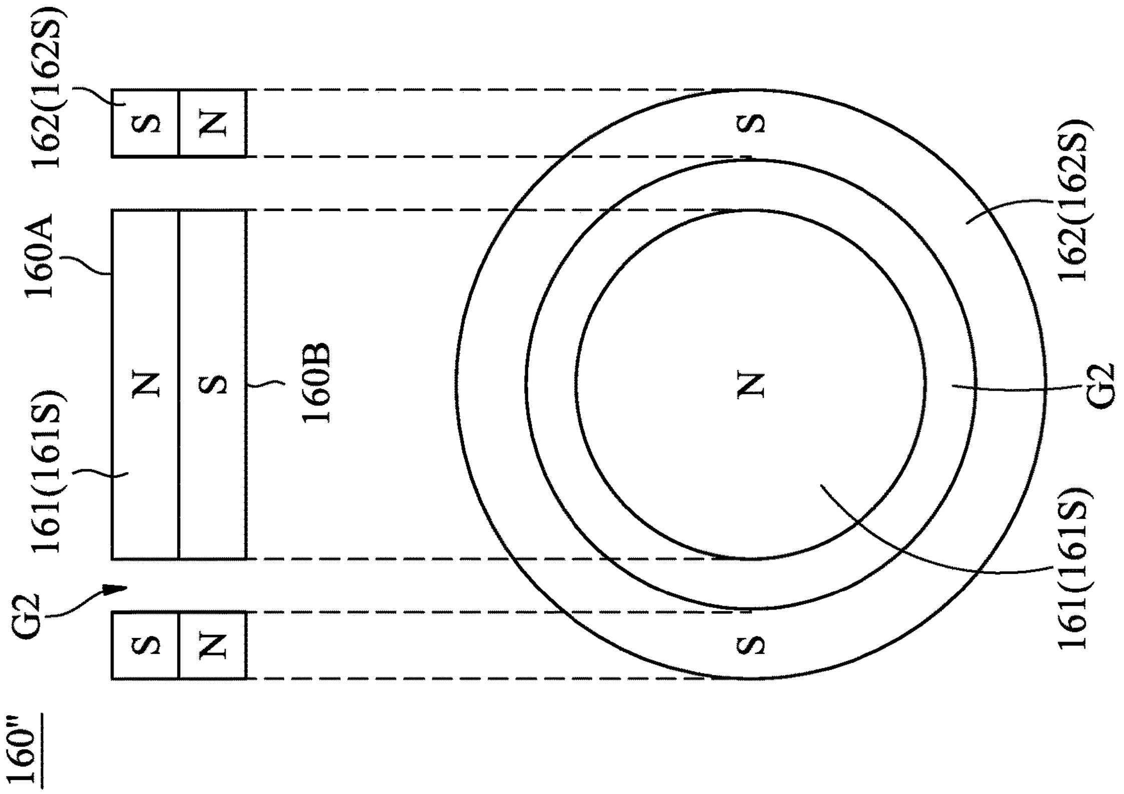
FIG. 7 illustrates various views of a magnet member, in accordance with some embodiments.

FIG. 7 illustrates various views of a magnet member 160", in accordance with another alternative embodiment, wherein the upper half of the figure shows a cross-sectional view of the magnet member 160", and the lower half shows a top view of the magnet member 160". The magnet member 160" is similar to the magnet member 160 described above, except that magnet member 160" further has an opening G2 (e.g., ring-shaped opening) formed around the first magnet 161 and separating the first magnet 161 form the second magnet 162. In this manner, the inner diameter of the second magnet 162 is greater than the diameter of the first magnet 161. Similarly, the presence of the opening G2 helps to increase the distribution of magnetic lines (not specifically shown) near the opening G2. It should be understood that, depending on the relative position of the multi-layered coil 120, the opening G1 and/or the opening G2 can be arbitrarily applied to the above-mentioned magnet member, and the position or number of the openings (G1, G2) can also be changed to enhance the force generated in the normal direction of the diaphragm 110.

In addition, although the magnet member 160 (or 160' or 160") is described above as consisting of two magnets 161 and 162, the magnet member 160 may also be an integral structure (i.e., one-piece structure) in different embodiments. For example, such a (one-piece) magnet member 160 may be formed by a magnetization technique (e.g., axial magnetization and/or radial magnetization) to have a first magnetic segment 161S and a second magnetic segment 162S, wherein the configuration, structure and polarity of the first and second magnetic segments 161S and 162S are the same or similar to those of the first and second magnets 161 and 162 (e.g., see FIGS. 4A-7). Details of the magnetization technique are not discussed herein.

Many variations and/or modifications can be made to embodiments of the disclosure. Some variations of some embodiments are described below.

Figure 8B:
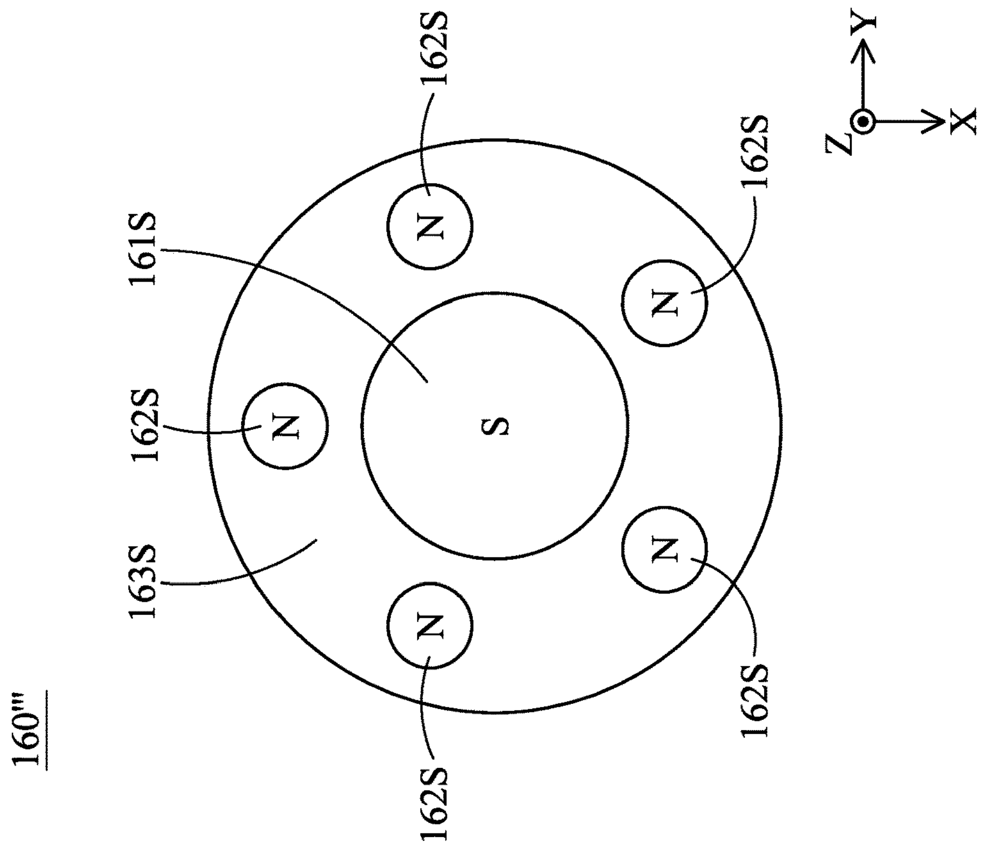
FIGS. 8A and 8B illustrate various views of a magnet member, in accordance with some embodiments.
Figure 8A:
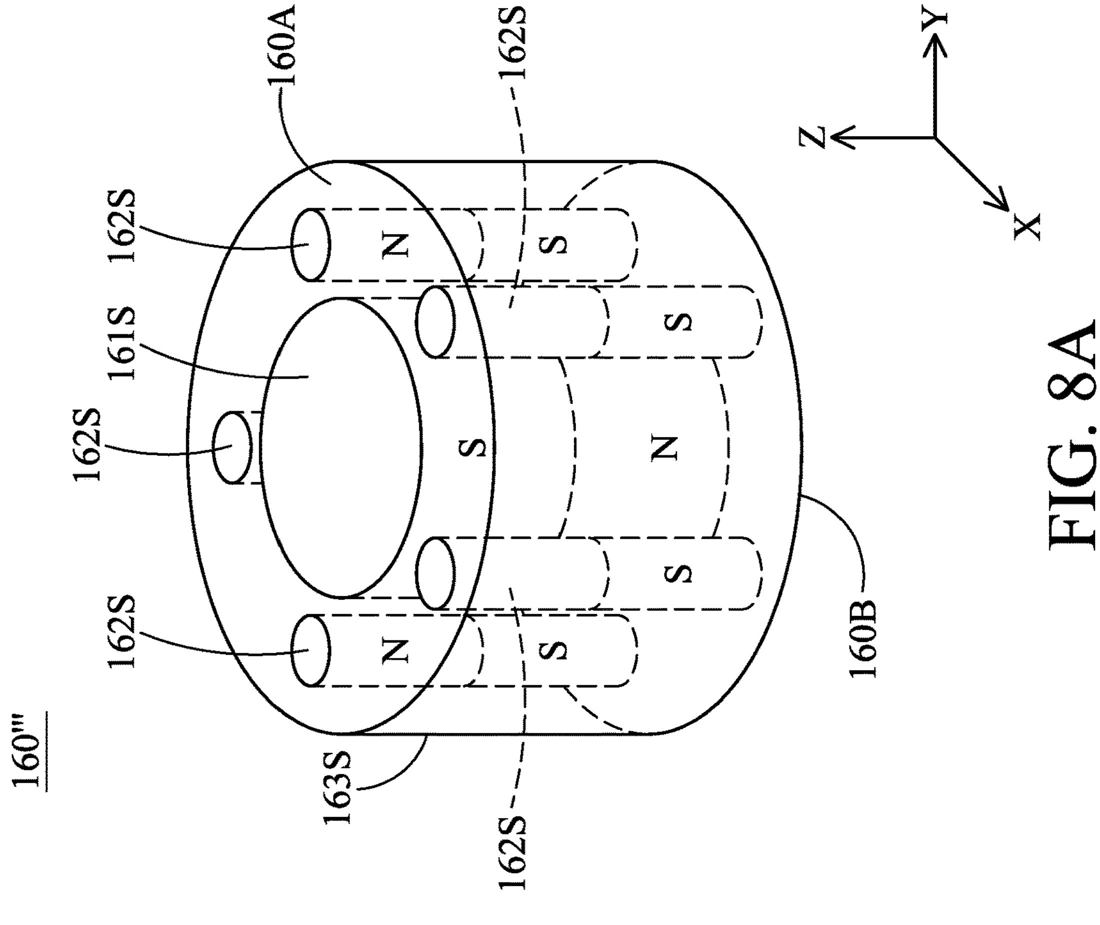

Referring to FIGS. 8A and 8B. FIG. 8A illustrates a stereoscopic perspective view of a magnet member 160" in accordance with some embodiments, and FIG. 8B illustrates a top view of the magnet member 160" in FIG. 8B. In the present embodiment, the magnet member 160" is an integral structure (i.e., one-piece structure), including a first magnetic segment 161S and a plurality of second magnetic segments 162S located around the first magnetic segment 161S, with a non-polar segment 163S between the first polar area 161S and the second polar areas 162S. The non-polar segment 163S may also surround the first polar area 161S and the second polar areas 162S such that only upper and lower ends of these polar areas (161S, 162S) are exposed. Each of the segments 161S, 162S and 163S may have a cylindrical structure (see FIG. 8A).

In addition, the first magnetic segment 161S and the second magnetic segments 162S have different polarities at respective first ends (e.g., the upper ends) adjacent to the first side 160A and have different polarities at respective second ends (e.g., the lower ends) adjacent to the second side 160B, similar to the first and second magnets (161, 162) described above. For example, in the example of FIGS. 8A and 8B, the first ends of the magnetic segments 161S and 162S are N-pole and S-pole respectively, and the second ends of the magnetic segments 161S and 162S are S-pole and N-pole respectively. However, in some other embodiments, the N-poles and S-poles of the magnetic segments 161S and 162S may be reversed. Similarly, such a (one-piece) magnet member 160'" may be formed by a magnetization technique (e.g., axial magnetization). By having multiple polar areas (e.g., a first polar area in the central area and several second polar areas around the second polar area) on the magnet surface (e.g., the top side 160A), the magnet member 160'" can also achieve similar advantages as the magnet member 160 (or 160' or 160") described above, such as improving the SPL.

Figure 9A:
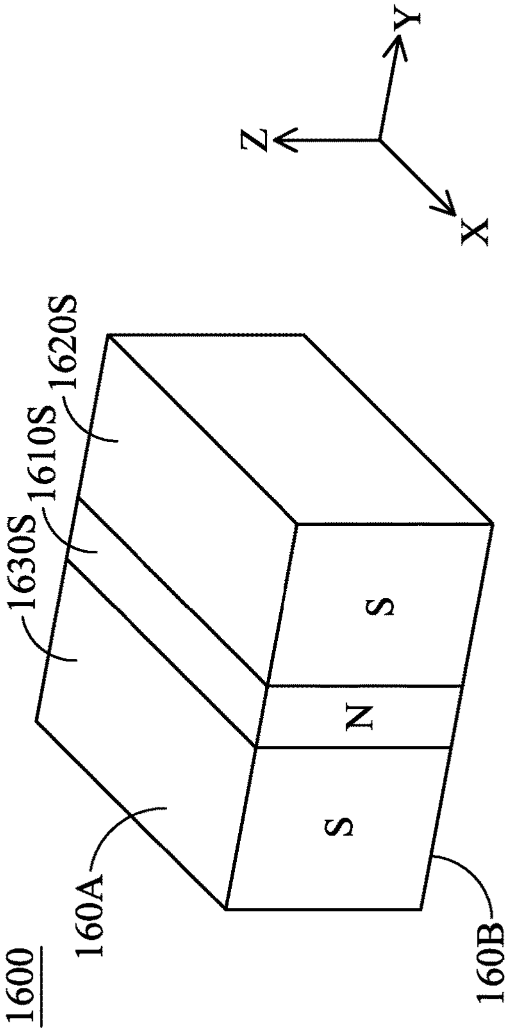
FIGS. 9A, 9B, and 9C illustrate various views of a magnet member, in accordance with some embodiments.
Figure 9C:
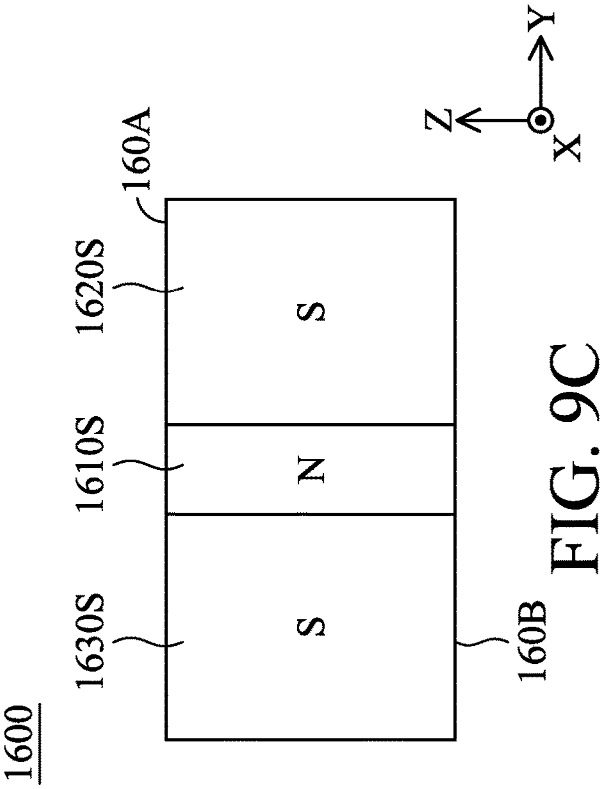
Figure 9B:
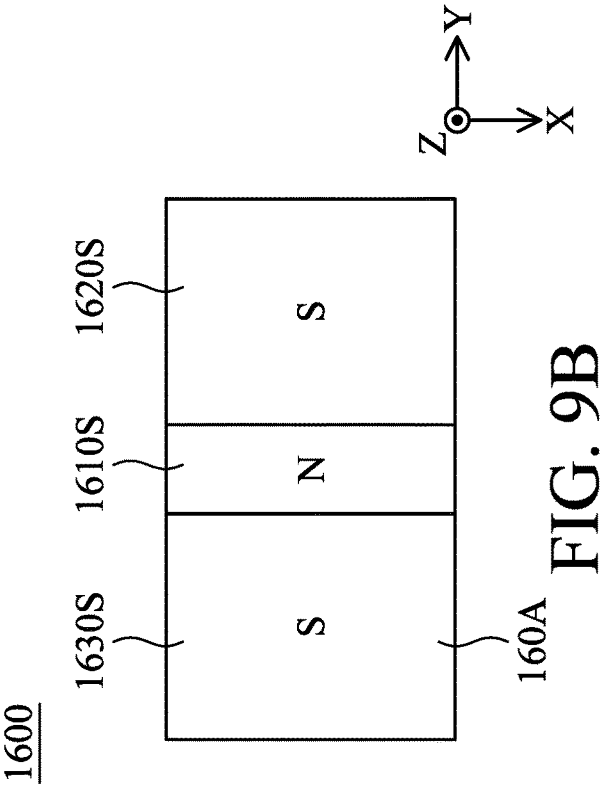

Referring to FIGS. 9A to 9C. FIG. 9A illustrates a stereo view of a magnet member 1600 in accordance with some embodiments, FIG. 9B illustrates a top view of the magnet member 1600 in FIG. 9A, and FIG. 9C illustrates a side view of the magnet member 1600 in FIG. 9A. In the present embodiment, the magnet member 1600 has a cuboid structure, and is an integral structure (i.e., one-piece structure) including a first magnetic segment 1610S, a second magnetic segment 1620S and a third magnetic segment 1630S. The first magnetic segment 1610S is located in the middle area of the magnet member 1600, and the second and third magnetic segments 1620S and 1630S are located on both sides of the first magnetic segment 1610S. Each of the segments 1610S, 1620S and 1630S may have a cuboid structure, and may extend from the first side 160A (facing the multi-layered coil 120) to the second side 160B of the magnet member 1600 (see FIG. 9A).

In addition, the first magnetic segment 1610S has a first polarity (e.g., N-pole), and the second magnetic segment 1620S and the third magnetic segment 1630S both have a second polarity (e.g., S-pole) different from the first polarity. Similarly, such a (one-piece) magnet member 1600 may be formed by a magnetization technique. By having multiple polar areas on the magnet surface (e.g., the top side 160A), the magnet member 1600 can also achieve similar advantages as the magnet member 160 (or 160' or 160") described above, such as improving the SPL.

Figure 10A:
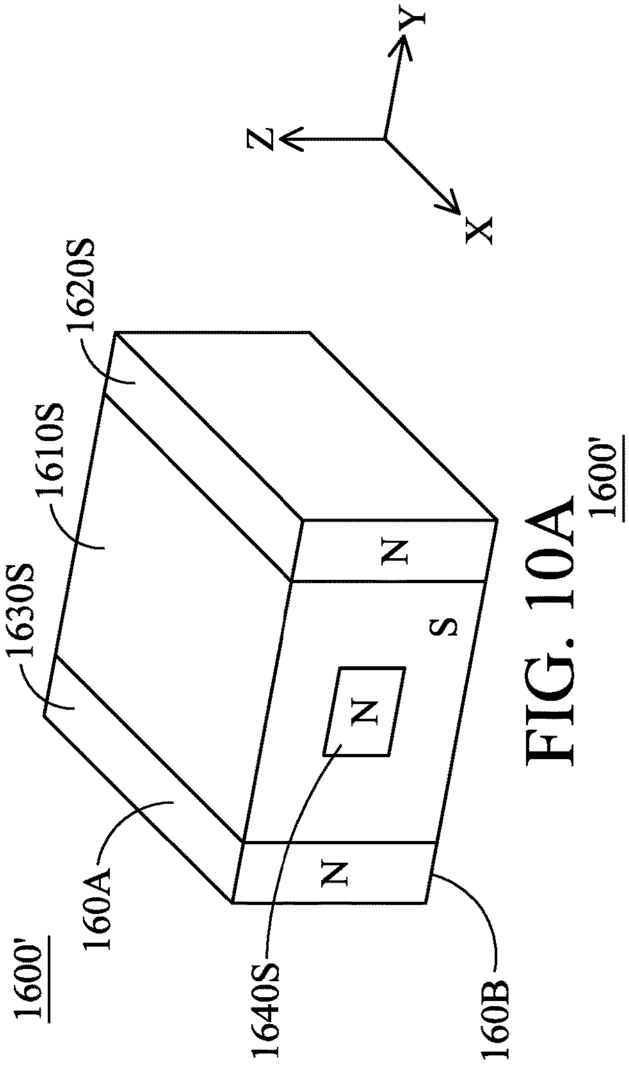
FIGS. 10A, 10B, and 10C illustrate various views of a magnet member, in accordance with some embodiments.
Figure 10C:
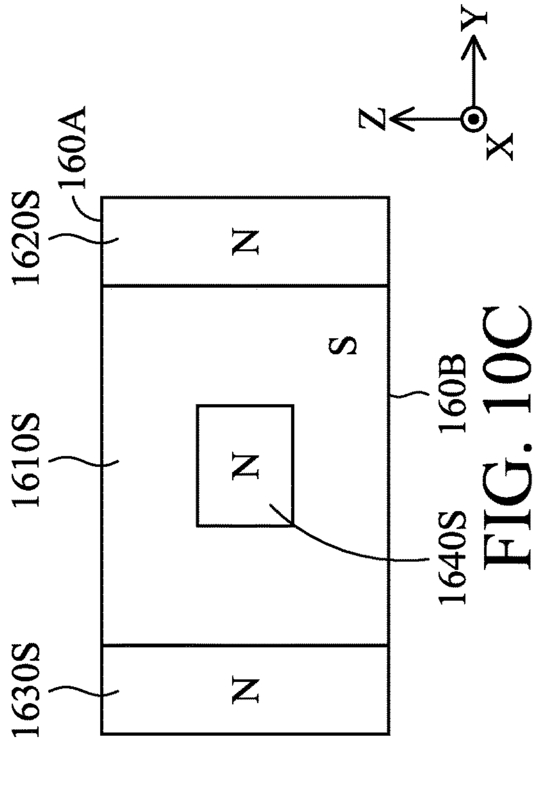
Figure 10B:
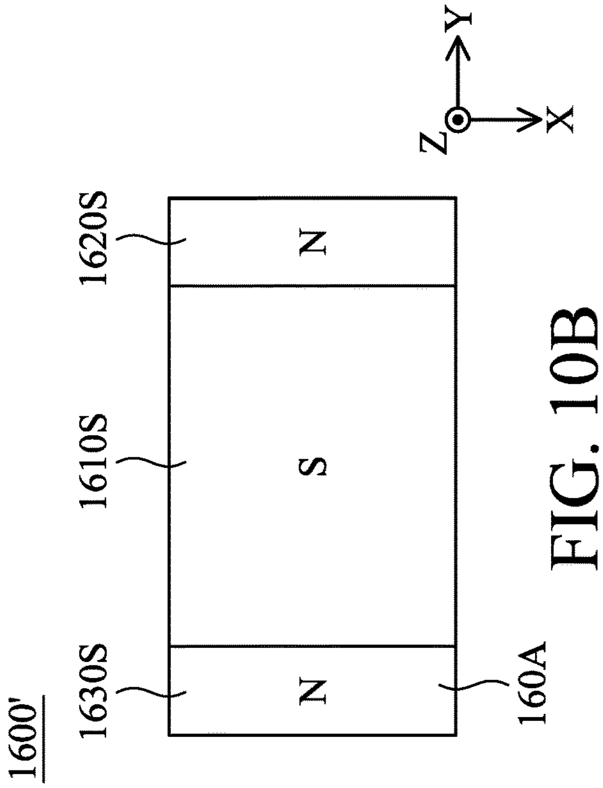

Similarly, FIGS. 10A, 10B and 10C illustrate various views (e.g., a stereo view, a top view and a side view) of a magnet member 1600' in accordance with some embodiments. The magnet member 1600' is similar to the magnet member 1600 described above, except that magnet member 1600' further includes has a fourth magnetic segment 1640S. The fourth magnetic segment 1640S may be surrounded by the first magnetic segment 1610S (e.g., embedded in the first magnetic segment 1610S), and may extend from a sidewall of the magnet member 1600' to an opposing sidewall, so that the fourth magnetic segment 1640S is exposed through the first magnetic segment 1610S. In addition, the fourth magnetic segment 1640S has the same polarity as the second magnetic segment 1620S and the third magnetic segment 1630S (i.e., has a different polarity than the first magnetic segment 1610S). By forming the fourth magnetic segment 1640S, the stability of the magnetic line loop (not specifically shown) can be further improved. As a result, the reliability of the micro speaker structure 10 is also improved.

Figure 11:
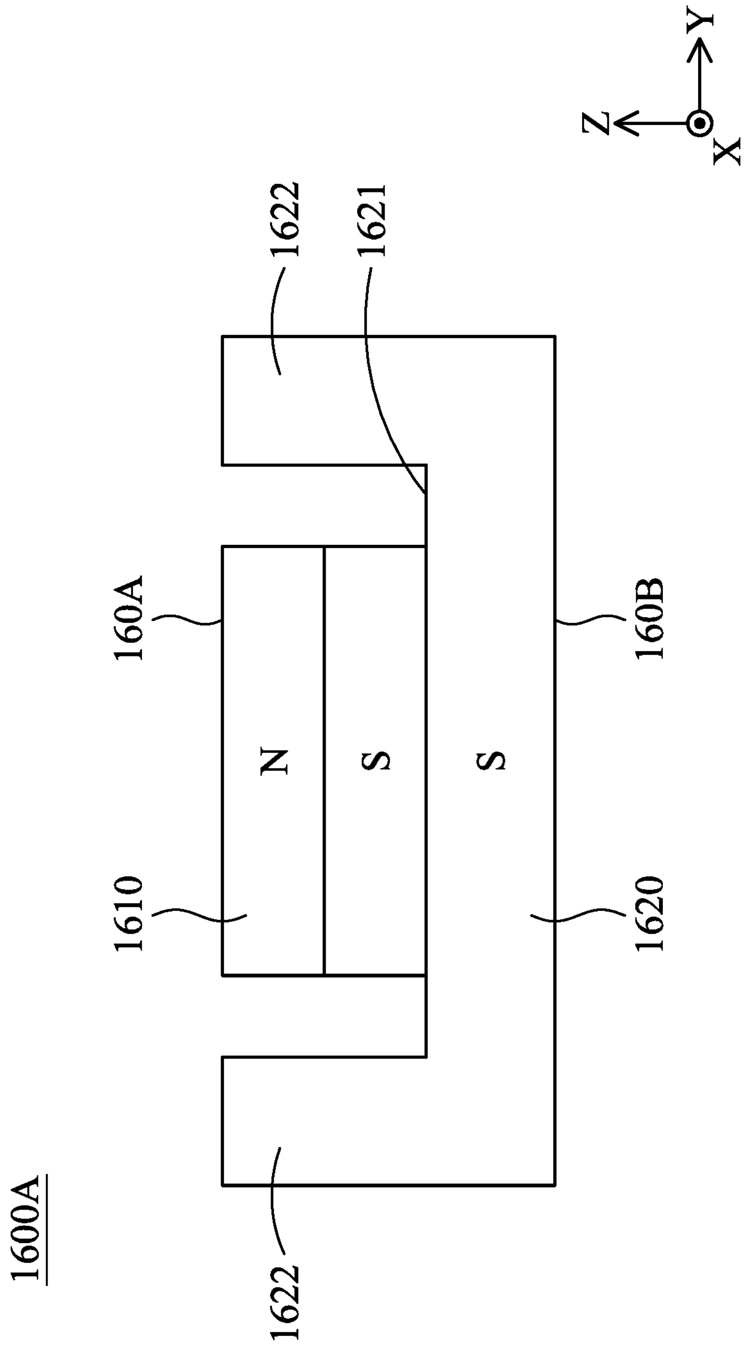
FIG. 11 illustrates a cross-sectional view of a magnet member, in accordance with some embodiments.

FIG. 11 illustrates a cross-sectional view of a magnet member 1600A, in accordance with some embodiments. The magnet member 1600A includes a permanent magnet 1610 and a magnetic permeability element 1620. The permanent magnet 1610 may be similar to the first magnet 161 described above in FIGS. 4A-5B. The material of the magnetic permeability element 1620 may include Mu-Metal, silicon steel, ferrite, or any other applicable magnetic permeability material. The permanent magnet 1610 is placed on (e.g., in direct contact with) the top surface 1621 of the magnetic permeability element 1620, and the magnetic permeability element 1620 has a sidewall 1622 extending from the top surface 1621 and surrounding the permanent magnet 1610. The top surfaces of the sidewall 1622 and the permanent magnet 1610 may be at substantially the same level (i.e., at same height in the Z-axis direction), thereby forming the top side 160A of the magnet member 1600A.

With the above configuration, the magnetic permeability element 1620 (e.g., the sidewall 1622) and the first end (e.g., the upper end) of the permanent magnet 1610 have different polarities. Accordingly, multiple polar areas on the top side 160A of the magnet member 1600A can be achieved. Therefore, the magnet member 1600A can also achieve similar advantages as the magnet member 160 (or 160' or 160") described above, such as improving the SPL.

It should be understood that the structures, configurations and the manufacturing methods of the magnet member described herein are only illustrative, and are not intended to be, and should not be construed to be, limiting to the present disclosure. Many alternatives and modifications will be apparent to those skilled in the art, once informed by the present disclosure.

Figure 12:
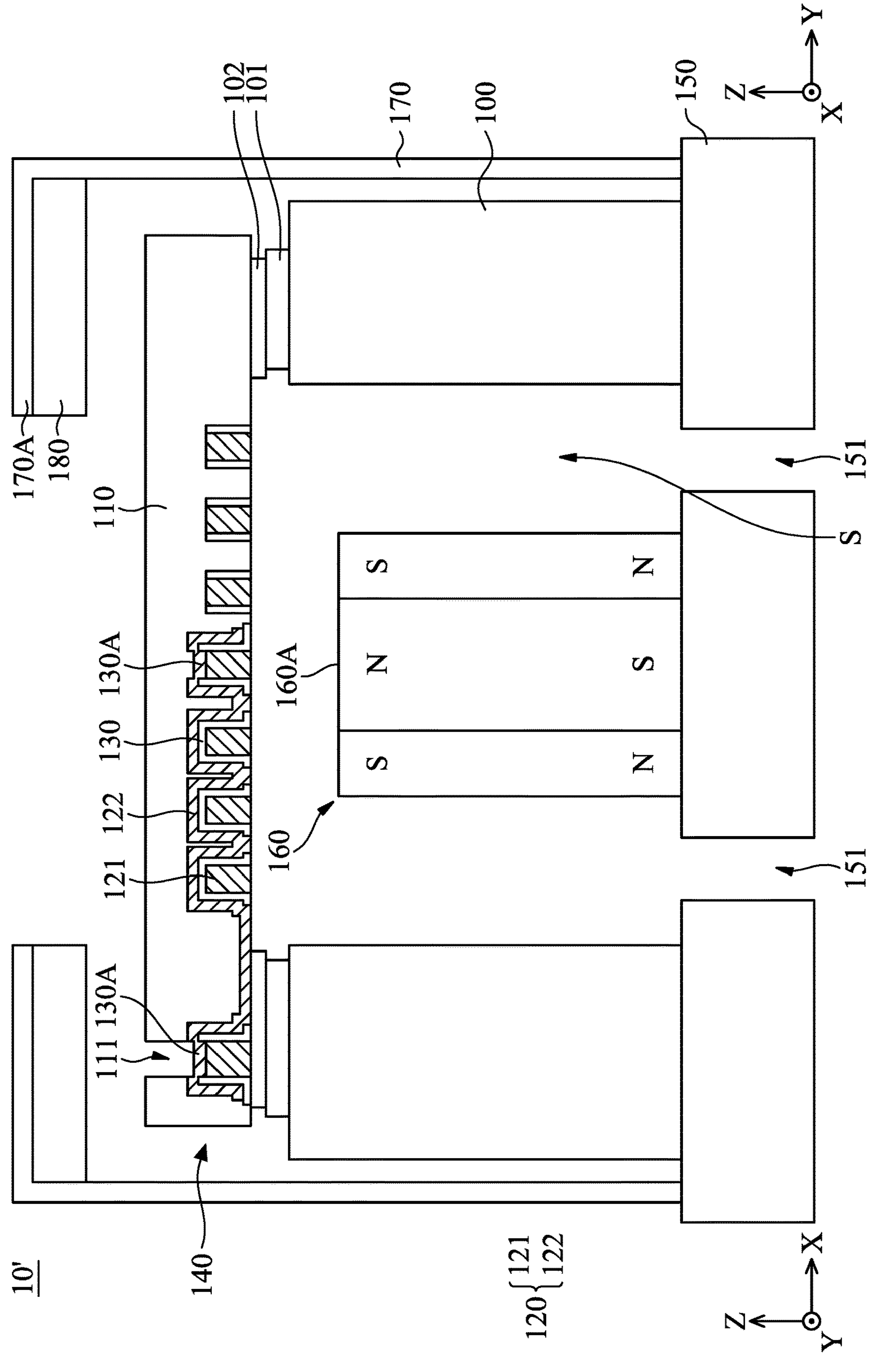
FIG. 12 illustrates a cross-sectional view of a micro speaker structure, in accordance with some embodiments.

FIG. 12 illustrates a cross-sectional view of a micro speaker structure 10', in accordance with some embodiments. The micro speaker structure 10' is similar to the micro speaker structure 10 described above, except that the micro speaker structure 10' further includes a package lid 170 and a permanent magnet 180. The package lid 170 is disposed on or attached to the carrier board 150, and is designed to wrap around and protect the substrate 100 and the diaphragm 110. The package lid 170 may have a lid opening 170A to allow acoustic energy due to vibration of the diaphragm 110 to travel out of the micro speaker structure 10'. In some embodiments, the package lid 170 is made of a metal material having a magnetic permeability lower than about 1.25×10-4 H/mm, such as gold (Au), copper (Cu), aluminum (Al), or a combination thereof, which helps maintain or confine the magnetic field in the micro speaker structure 10'.

The permanent magnet 180 is disposed above the diaphragm 110 (e.g., attached to the package lid 170). In the example of FIG. 12, the permanent magnet 180 may have a ring structure conforming to the shape of the lid opening 170A of package lid 170 (for example, the lid opening 170A is circular and the permanent magnet 180 is circular ring-shaped, but the present disclosure is not limited thereto), and may be disposed below the lid opening 170A. In some alternative embodiments (not shown), the permanent magnet 180 may be disposed above the lid opening 170A of package lid 170. In some embodiments, the permanent magnet 180 is a neodymium iron boron magnet. In other embodiments, other permanent magnet materials may also be used.

The permanent magnet 180 and the magnet member 160 can attract each other to increase the deflection of the planar magnetic field. Accordingly, the force generated by the current passing through the multi-layered coil 120 and the planar magnetic field in the normal direction of the diaphragm 110 increases, so that the diaphragm 110 has a better frequency response, thereby improving the performance of the micro speaker structure 10'.

In some embodiments, the distance between the magnet member 160 and the permanent magnet 180 may be in a range between about 200 μm and about 1000 μm. If the distance is greater than 1000 μm, there may not be sufficient attraction between the magnet member 160 and the permanent magnet 180 to increase the deflection of the planar magnetic field, resulting in a smaller frequency response of the micro speaker structure. Therefore, the performance of the micro speaker structure is degraded. If the distance is less than 200 μm, when the diaphragm 110 deforms up and down relative to the substrate 100, it may repeatedly contact and strike the magnet member 160 and/or the permanent magnet 180, which causes damage to the micro speaker structure. Therefore, the reliability of the micro speaker structure is reduced.

Figure 13:
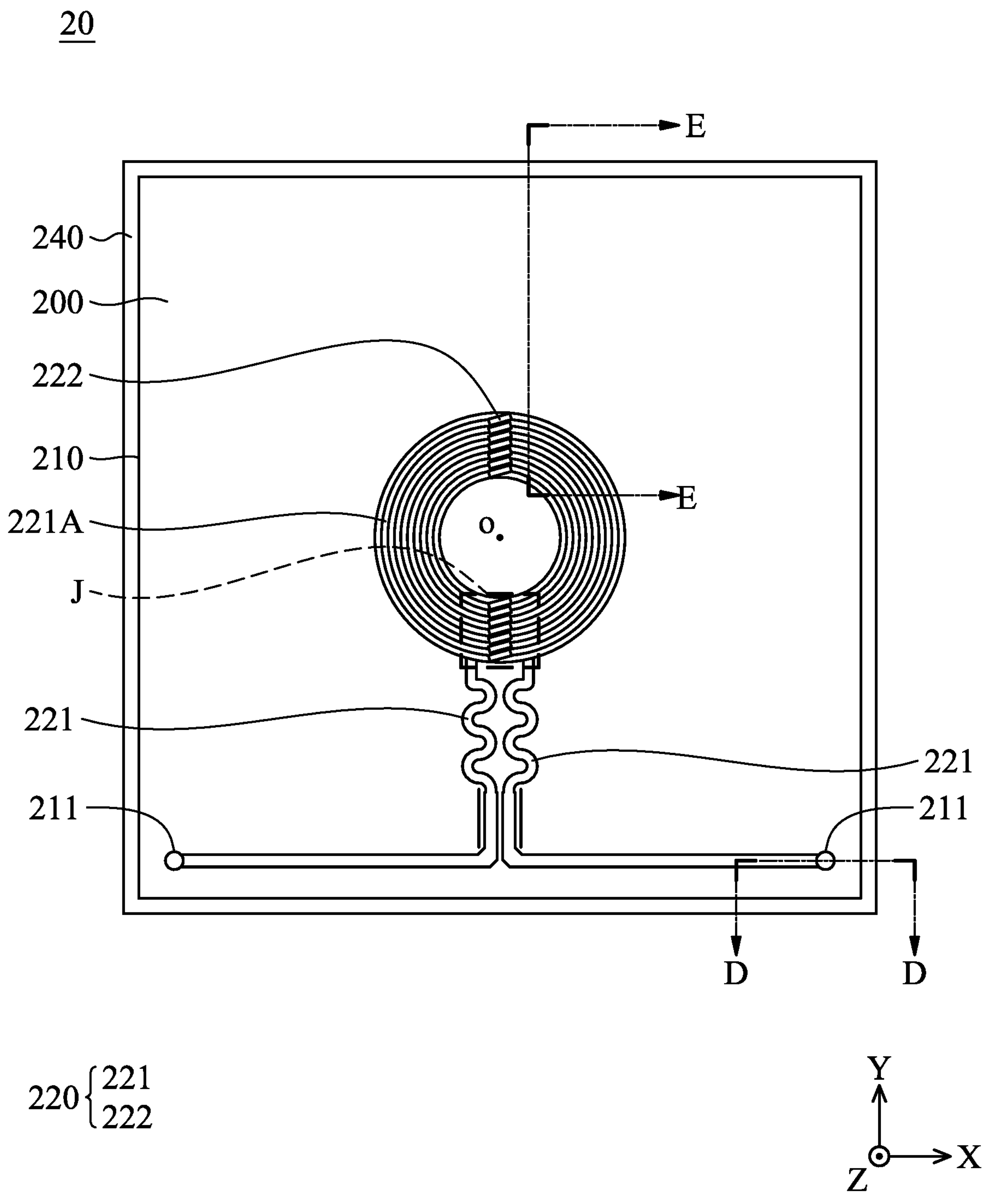
FIG. 13 illustrates a top view of a micro speaker structure, in accordance with some embodiments.

FIG. 13 is a top view illustrating a micro speaker structure 20, in accordance with some other embodiments. It should be appreciated that the micro speaker structure 20 may include the same or similar components as the micro speaker structure 10 shown in FIG. 1, and those components that are the same or similar will be labeled with similar numerals, the details thereof are not repeated here. For example, the micro speaker structure 20 includes a substrate 200, a diaphragm 210, and a multi-layered coil 220. Similarly, it should be noted that in the example of FIG. 13, the diaphragm 210 is illustrated to be transparent in order to show internal structures of the micro speaker structure 20.

Figure 14:
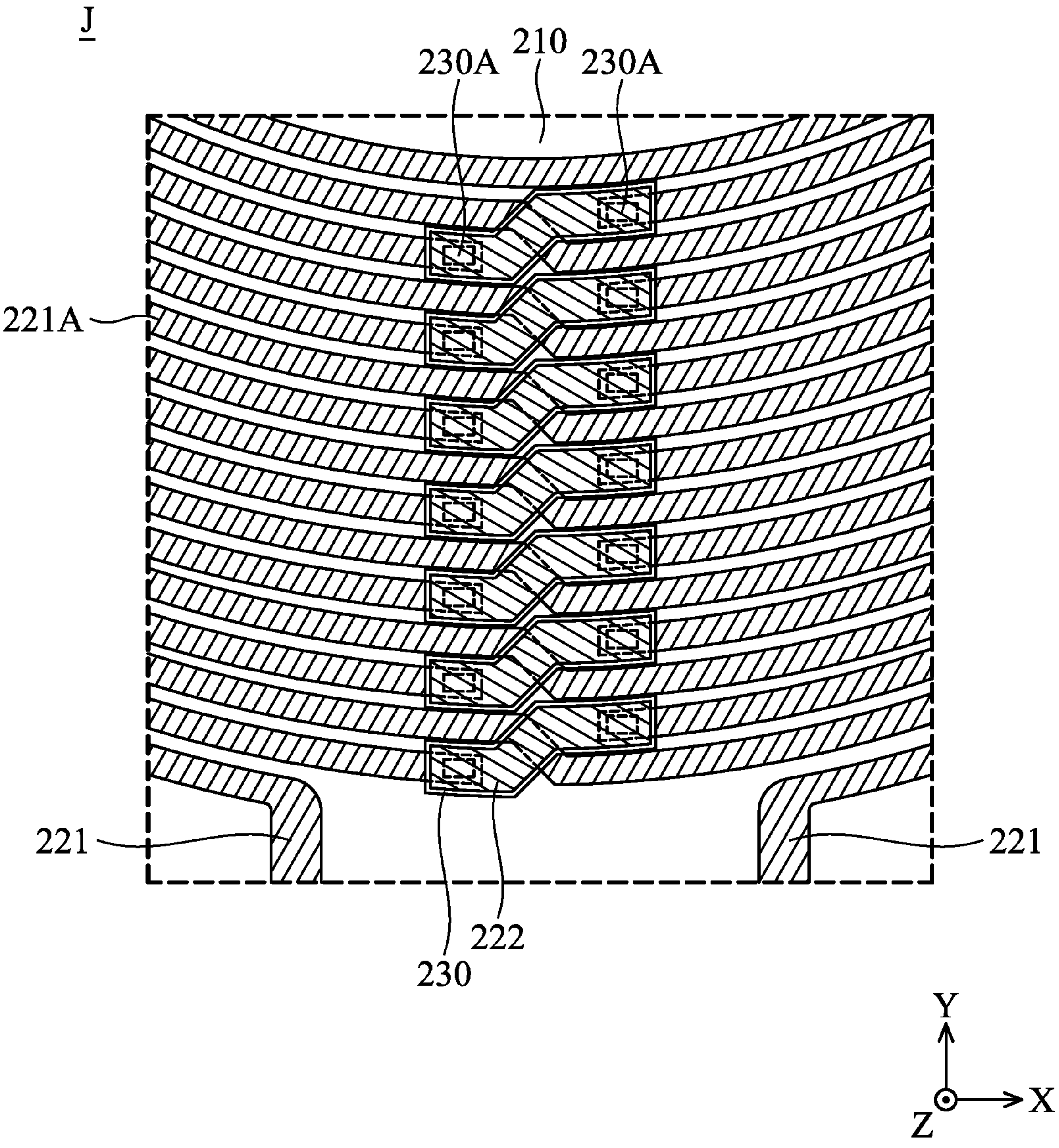
FIG. 14 illustrates an enlarged view of the area J shown in FIG. 13, in accordance with some embodiments.

In the present embodiment, the multi-layered coil 220 is also embedded in the diaphragm 210, and includes a first layer 221 and a second layer 222, which are located on different planes which are parallel to the X-Y plane. The difference between the micro speaker structure 20 and the micro speaker structure 10 shown in FIG. 1 is that the first layer 221 of the multi-layered coil 220 includes a plurality of coaxial segments 221A disposed around the central axis O of the diaphragm 210, and the coaxial segments 221A are electrically connected by the second layer 222. It should be appreciated that the multi-layered coil 220 is schematically illustrated in FIG. 13, and the detailed structure of the multi-layered coil 220 (such as the coaxial segments 221A) is shown in FIG. 14. Furthermore, the second layer 222 is disposed symmetrically around the central axis O of the diaphragm 210.

FIG. 14 is a schematic enlarged view illustrating the region J shown in FIG. 13. As shown in FIG. 13, the second layer 222 connects the separated coaxial segments 221A of the first layer 221. A dielectric layer 230 is disposed between the first layer 221 and the second layer 222 in order to prevent a short circuit between the first layer 221 and the second layer 222. Through holes 230A (shown in dashed lines) can be formed in the dielectric layer 230, and the first layer 221 is electrically connected to the second layer 222 via the through holes 230A.

Figure 15:
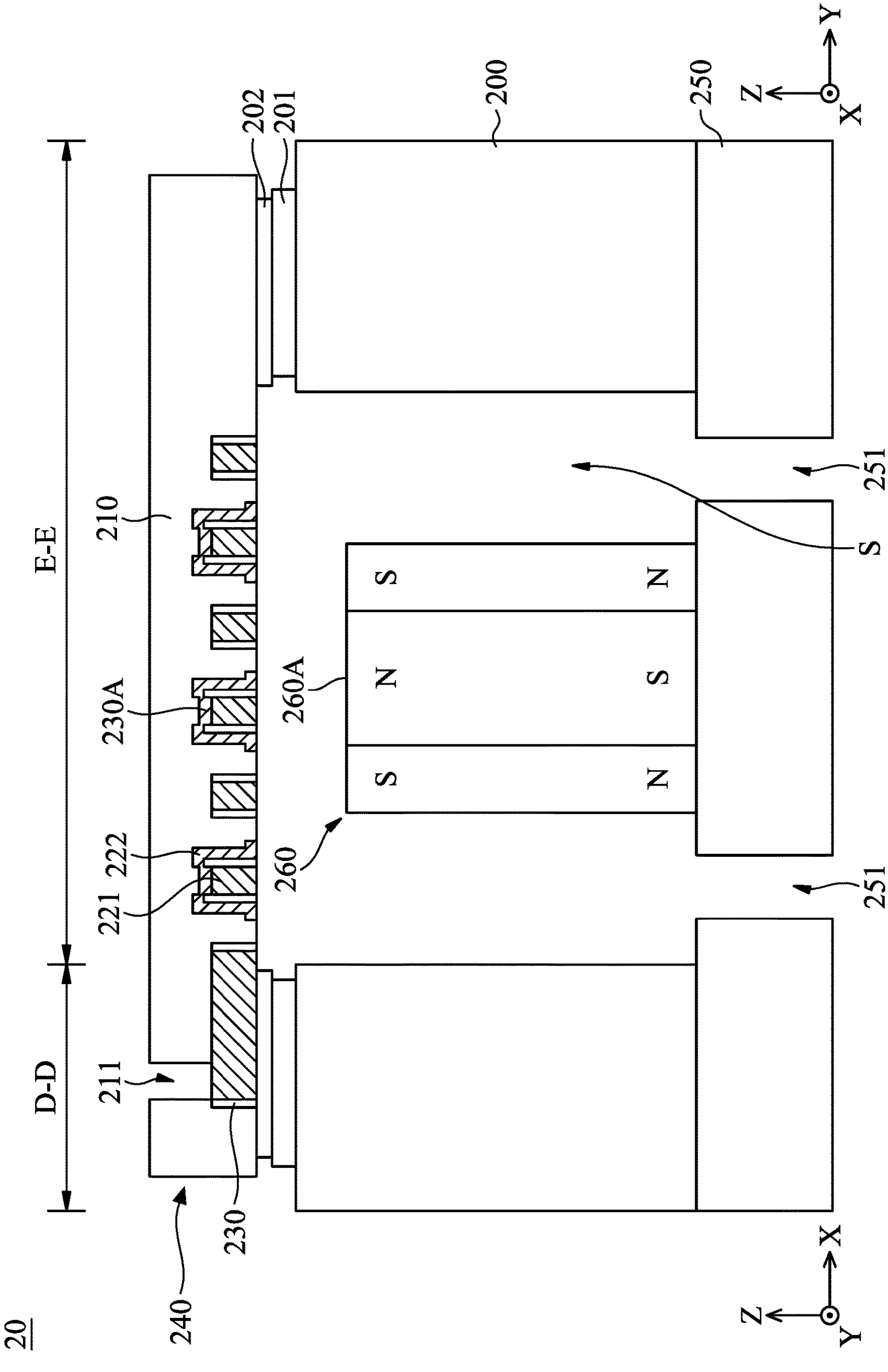
FIG. 15 illustrates a cross-sectional view of the micro speaker structure shown in FIG. 13, in accordance with some embodiments.

FIG. 15 is a schematic cross-sectional view illustrating the micro speaker structure 20 shown in FIG. 13. It should be understood that FIG. 15 includes cross-sectional views along line D-D and line E-E shown in FIG. 13. Two sets of coordinate axes are provided in FIG. 15, wherein one set of coordinate axes in the left-hand side correspond the cross-sectional view along line D-D, and the other set of coordinate axes in the right-hand side correspond the cross-sectional view along line E-E.

The detailed structure of the micro speaker structure 20 is shown in FIG. 15. The structure and fabrication processes of the micro speaker structure 20 are substantially the same as those of the micro speaker structure 10 described above, and will not be described in detail again. As shown in FIG. 15, the second layer 222 of the multi-layered coil 220 distributes substantially evenly in the diaphragm 210. When the diaphragm 210 oscillates relative to the substrate 200, the distribution of the oscillating force may be more even. Therefore, the total harmonic distortion (THD) value of the micro speaker structure 20 may be reduced, and the lifetime of the micro speaker structure 20 may be longer.

As described above, embodiments of the present disclosure provide micro speaker structures with novel magnet member designs. The micro speaker structures can be formed using micro electromechanical system (MEMS) technique. Therefore, the size of the micro speaker structures may be significantly reduced. In addition, by providing novel magnet members with multiple polar areas on the magnet surface (e.g., facing the coil structure), the sound pressure level (SPL) of the micro speaker structures can be increased without increasing the size of the micro speaker structures. Therefore, the performance of the micro speaker structures is also enhanced.

Although embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A micro speaker structure, comprising:

a substrate having a hollow chamber;

a diaphragm disposed over the substrate and covering the hollow chamber;

a coil embedded in the diaphragm;

a circuit board attached to the substrate; and a magnet member disposed on the circuit board and in the hollow chamber, wherein the magnet member has a first side facing the coil and a second side opposite the first side, the first side includes a first polar area and a second polar area having different polarities, and the first side and the second side of the magnet member have different polarities.

2. The micro speaker structure as claimed in claim 1, wherein the magnet member has a cylindrical structure, and wherein the first polar area is located in a central area of the first side, and the second polar area is located in a peripheral area of the first side surrounding the central area.

3. The micro speaker structure as claimed in claim 2, wherein the magnet member includes a first magnet having a cylindrical structure and a second magnet having a ring structure surrounding the cylindrical structure, and wherein the first magnet and the second magnet have different polarities at respective first ends adjacent to the first side and have different polarities at respective second ends adjacent to the second side.

4. The micro speaker structure as claimed in claim 3, wherein the magnet member has an opening formed in the first magnet and extending through the first end and the second end of the first magnet.

5. The micro speaker structure as claimed in claim 3, wherein the magnet member has an opening around the first magnet and separating the first magnet from the second magnet.

6. The micro speaker structure as claimed in claim 2, wherein the magnet member is an integral structure, including a first segment and a second segment, the first segment has a cylindrical structure, and the second segment has a ring structure surrounding the cylindrical structure, and wherein the first segment and the second segment have different polarities at respective first ends adjacent to the first side and have different polarities at respective second ends adjacent to the second side.

7. The micro speaker structure as claimed in claim 1, wherein the magnet member has a cylindrical structure, and wherein the first polar area is located in a central area of the first side, and the first side further includes a plurality of second polar areas located around the first polar area, with a non-polar area between the first polar area and the second polar areas.

8. The micro speaker structure as claimed in claim 7, wherein the magnet member is an integral structure, including a first segment and a plurality of second segments, wherein each of the first segment and the second segments has a cylindrical structure, the second segments are located around the first segment, and the first segment and the second segments are surrounded by a non-polar segment, and wherein the first segment and the second segments have different polarities at respective first ends adjacent to the first side and have different polarities at respective second ends adjacent to the second side.

9. The micro speaker structure as claimed in claim 1, wherein the coil vertically overlaps both the first polar area and the second polar area.

10. The micro speaker structure as claimed in claim 1, further comprising:

a package lid wrapped around the substrate and the diaphragm, wherein the package lid has a lid opening that exposes a portion of the diaphragm; and a permanent magnet disposed on the package lid.

11. The micro speaker structure as claimed in claim 1, wherein the coil is a multi-layered coil including a first layer and a second layer, and wherein the first layer has a spiral structure surrounding a central axis of the diaphragm, and the second layer crosses over the spiral structure of the first layer and is electrically connected to the first layer.

12. The micro speaker structure as claimed in claim 1, wherein the coil is a multi-layered coil including a first layer and a second layer, and wherein the first layer comprises a plurality of coaxial segments disposed around a central axis of the diaphragm, and the coaxial segments are electrically connected by the second layer.

13. The micro speaker structure as claimed in claim 12, wherein the second layer is disposed symmetrically around the central axis of the diaphragm.

14. A micro speaker structure, comprising:

a substrate having a hollow chamber;

a diaphragm disposed over the substrate and covering the hollow chamber;

a coil embedded in the diaphragm;

a circuit board attached to the substrate; and a magnet member disposed on the circuit board and in the hollow chamber, wherein the magnet member has a first side facing the coil and a second side opposite the first side, the first side includes a first polar area and a second polar area having different polarities, and the first side has the same polarity as the second side, wherein the magnet member has a cuboid structure, and wherein the first polar area is located in a middle area of the first side, and the first side further includes a third polar area, wherein the second polar area and the third polar area are located on both sides of the first polar area and have the same polarity.

15. The micro speaker structure as claimed in claim 14, wherein the magnet member is an integral structure, including a first segment, a second segment and a third segment, each of the first segment, the second segment and the third segment has a cuboid structure, and the second segment and the third segment are located on both sides of the first segment, and wherein the first segment has a first polarity, and the second segment and the third segment both have a second polarity that is different from the first polarity.

16. The micro speaker structure as claimed in claim 15, wherein the magnet member further includes a fourth segment surrounded by the first segment, and the fourth segment has the same polarity as the second segment and the third segment.

17. A micro speaker structure, comprising:

a substrate having a hollow chamber;

a diaphragm disposed over the substrate and covering the hollow chamber;

a coil embedded in the diaphragm;

a circuit board attached to the substrate; and a magnet member disposed on the circuit board and in the hollow chamber, wherein the magnet member includes a permanent magnet and a magnetic permeability element, the permanent magnet is in direct contact with a top surface of the magnetic permeability element, and the magnetic permeability element has a sidewall extending from the top surface and surrounding the permanent magnet, and wherein a first end of the permanent magnet adjacent to the first side and a second end of the permanent magnet adjacent to the second side have different polarities, and the magnetic permeability element and the first end of the permanent magnet have different polarities.

* * * * *